(12) United States Patent
Hutchins et al.

(10) Patent No.: US 7,246,074 B1
(45) Date of Patent: Jul. 17, 2007

(54) SYSTEM AND METHOD FOR IDENTIFYING SKILLS AND TOOLS NEEDED TO SUPPORT A PROCESS UTILIZING PRE-DEFINED TEMPLATES

(75) Inventors: Mark Andrew Hutchins, Waxhaw, NC (US); Ida Mae Olin, Chicago, IL (US); Michael Thomas O'Mara, Alpharetta, GA (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 09/688,311

(22) Filed: Oct. 13, 2000

(51) Int. Cl.
*G06F 9/44* (2006.01)

(52) U.S. Cl. .......................................................... 705/7

(58) Field of Classification Search .................... 705/8, 705/10, 9, 7
See application file for complete search history.

(56) References Cited

U.S. PATENT DOCUMENTS

| | | | | |
|---|---|---|---|---|
| 5,164,897 A | * | 11/1992 | Clark et al. ..................... | 705/1 |
| 5,596,704 A | * | 1/1997 | Geddes et al. ............... | 345/763 |
| 5,657,460 A | * | 8/1997 | Egan et al. ................. | 345/763 |
| 5,737,727 A | * | 4/1998 | Lehmann et al. ............... | 705/7 |
| 5,796,951 A | * | 8/1998 | Hamner et al. ............. | 709/223 |
| 5,826,252 A | * | 10/1998 | Wolters et al. ................. | 707/1 |
| 5,890,131 A | * | 3/1999 | Ebert et al. ..................... | 705/7 |
| 6,049,776 A | * | 4/2000 | Donnelly et al. ............. | 705/8 |
| 6,266,659 B1 | | 7/2001 | Nadkarni ....................... | 707/3 |
| 6,275,812 B1 | * | 8/2001 | Haq et al. ..................... | 705/11 |
| 6,289,340 B1 | * | 9/2001 | Puram et al. ................. | 707/5 |
| 6,336,138 B1 | * | 1/2002 | Caswell et al. ............. | 709/223 |
| 6,381,610 B1 | * | 4/2002 | Gundewar et al. ....... | 707/104.1 |
| 6,415,321 B1 | * | 7/2002 | Gleichauf et al. .......... | 709/224 |
| 6,670,973 B1 | * | 12/2003 | Hill et al. .................... | 715/853 |
| 6,671,693 B1 | * | 12/2003 | Marpe et al. ................ | 707/102 |
| 6,678,671 B1 | * | 1/2004 | Petrovic et al. ................ | 707/1 |
| 6,687,677 B1 | * | 2/2004 | Barnard et al. ................ | 705/7 |
| 6,738,746 B1 | * | 5/2004 | Barnard et al. ................ | 705/7 |
| 2002/0077842 A1 | * | 6/2002 | Charisius et al. .............. | 705/1 |
| 2002/0188430 A1 | * | 12/2002 | Benny et al. .................. | 703/7 |

(Continued)

FOREIGN PATENT DOCUMENTS

EP 0895171 A2 * 2/1999

OTHER PUBLICATIONS

"Microsoft Project 4 for Windows Step by Step", Microsoft Press, 1994.*

(Continued)

*Primary Examiner*—Catherine M. Tarae
*Assistant Examiner*—Scott L. Jarrett
(74) *Attorney, Agent, or Firm*—Scully, Scott, Murphy & Presser, P.C.; William E. Schiesser

(57) ABSTRACT

A method and system to identify skills and tools needed to address a process. The method comprises the steps of storing in a computer database a series of templates identifying pre-given sub-processes, managed elements, skills and tools; and accessing the computer database to use the templates to identify a set of sub-processes for a process, and to identify a set of managed elements. The set of sub-processes and the set of managed elements are used to form a matrix having a multitude of cells. The templates are also used to identify a set of skills and tools for each of the cells of the matrix.

13 Claims, 58 Drawing Sheets

U.S. PATENT DOCUMENTS

2003/0055749 A1* 3/2003 Carmody et al. ............. 705/28

OTHER PUBLICATIONS

Systems Management Design Overview for Executives, IBM Red Book, Feb. 1996, SG24-4687-00, German.*
Systems Management Design Overview for Executives, IBM Red Book, Feb. 1996, SG24-4687-00, USPTO English Translation.*
A Project Gudie for Deploying Tivoli Solutions, IBM Red Book, Apr. 1999, SG24-5310-00.*
Designing Tivoli Solutions for End-to-End Systems and Service Management, IBM Red Book, Jun. 1999, SG24-5104-00.*
IBM and the IT Infrastructure Library IBM Global Services, Jan. 2002, G510-3008-00.*
IEEE Standard for Developing Software Life Cycle Processes IEEE Std 1074-1995, Sep. 1995.*
IEEE Standard for Application and Management of Systems Engineering Process IEEE Std 1220-1998, Dec. 1998.*
Goodyear et al., Netcentric and Client/Server Computing: A Practical Guide Anderson Consulting, CRC Press, 1998, ISBN: 0-8493-9967-X.*

* cited by examiner

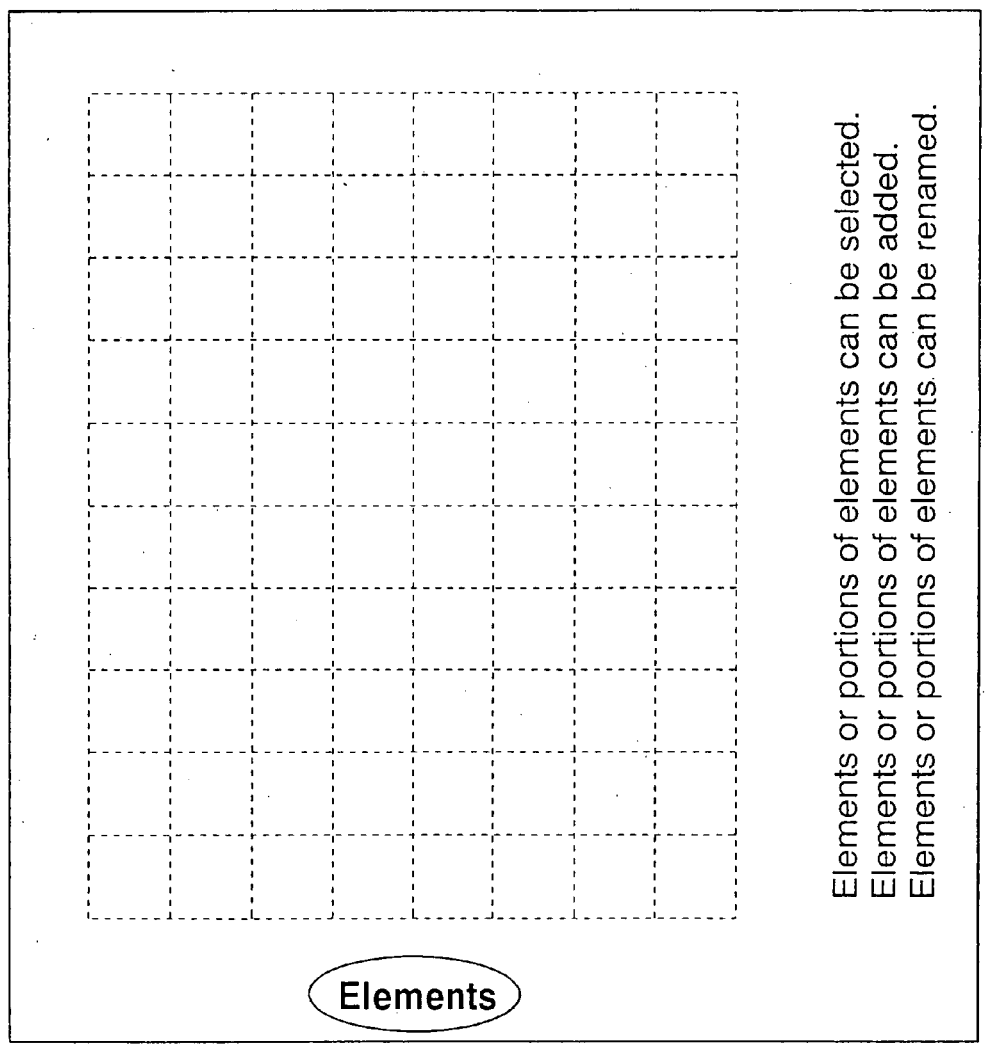

| Components |

Working Element Set

- Desktop PC's Hardware
- Desktop PC's Software
- Desktop PC's Operating System
- Desktop PC's Middleware
- Desktop PC's Database
- Desktop PC's Applications 3) Verify the elements selected are in the working set

[Components]

Working Element Set

- Desktop PC's Hardware
- Desktop PC's Software
- Desktop PC's Operating System
- Desktop PC's Middleware
- Desktop PC's Database
- Desktop PC's Applications

System Management Framework Design Tool - [Add or Edit Items]

Exit  Help

Element | SubProcess | Skill Requirement | Tool Requirement |

1) Define your new managed element.

○ Template            Level 1                    ⦿ Level 1
⦿ Working             Level 2                    ○ Level 2
                      Level 3                    ○ Level 3

Working

☐ ① Desktop PC's Hardware
☐ ① Desktop PC's Software
☐ ① Desktop PC's Operating System
☐ ① Desktop PC's Middleware
☐ ① Desktop PC's Database
☐ ① Desktop PC's Applications Add or Edit Items
[Start] [VPBuddy-i...] [Exhibit Les...] [Paint Shop...] [Freelance...]

FIG. 13A

System Management Framework Design Tool - [Add or Edit Items]

Exit  Help

Element | SubProcess | Skill Requirement | Tool Requirement

○ Template          Level 1        ⊙ Level 1
⊙ Working           Level 2        ○ Level 2
                    Level 3        ○ Level 3
Working ☑ ① Desktop PC's Hardware
  ⊞ ☐ ② ALL
  ⊞ ☐ ② Processor
  ⊞ ☐ ② Memory
  ⊞ ☐ ② Disk
  ⊞ ☐ ② Network
  ⊞ ☐ ② Peripherals
☐ ① Desktop PC's Software
☐ ① Desktop PC's Operating System
☐ ① Desktop PC's Middleware
☐ ① Desktop PC's Database
☐ ① Desktop PC's Applications 1) Or rename an existing managed element.

Add or Edit Items
Start | VPBuddy-i... | Exhibit Les... | Paint Shop... | Freelance...

FIG. 18A

System Management Framework Design Tool - [Add or Edit Items]

Exit  Help

Element | SubProcess | Skill Requirement | Tool Requirement |

○ Template          Process ID

◉ Working           Process Title

Working             Subprocess ID

Subprocess Title

☐ 🖬 Change Management   Model

Tasks

Description

○ Process
                    ○ Subprocess
                    ○ Task

Add or Edit Items
Start | VPBudd... | Exhibit... | Paint Sh... | Syste...

2) Add or edit the process or subprocess using the editing capabilities

FIG. 21A

System Management Framework Design Tool - [Stage 6: Solution

Requirement   Report   Exit   Help

⦿ Boilerplate

○ Element-Specific

Working Process/Subprocess

☐ ▤ Problem Management
  ☑ ▤ Identify Problem
    ☐ Received notification
    ☐ Verify this is a problem
  ⊞ ☐ ▤ Bypass/Recover from the
  ⊞ ☐ ▤ Analyze Problem
  ⊞ ☐ ▤ Resolve the Problem
  ⊞ ☐ ▤ Close the Problem
  ⊞ ☐ ▤ Monitor & Report on Prob
  ⊞ ☐ ▤ Improve the Problem Man

Template Requirements

| Check | Count | Category | ID |
|-------|-------|----------|-----|
|  | 1 | Skill | 587 |
|  | 2 | Skill | 766 |
|  | 3 | Skill | 768 |
|  | 4 | Skill | 780 |
|  | 5 | Skill | 784 |
|  | 6 | Skill | 793 |
|  | 7 | Skill | 850 |
|  | 8 | Skill | 909 |
|  | 9 | Skill | 1333 |
|  | 10 | Skill | 1338 |
|  | 11 | Skill | 1519 |
|  | 12 | Skill | 1520 |
|  | 13 | Skill | 1525 |
|  | 14 | Skill | 1538 |
|  | 15 | Skill | 1541 |

Working Requirements

| Check | Count | Category | ID |
|-------|-------|----------|-----|
|  | 1 | Skill | 793 |
|  | 2 | Skill | 1333 |

Stage 6: Solution Requirements
[ Start ] [ VPB... ] [ Blue... ] [ Expl... ] [ Micr... ] [ wor... ]

1) Select the Subprocess

FIG. 22A

| | System Management Framework Design Tool - [Stage 6: Solution |
|---|---|
| | Requirement Report Exit Help |

○ Boilerplate

⊙ Element-Specific

Working Element

☐ ⓘ Desktop PC's Hardware
☐ ⓘ Desktop PC's Software
☐ ⓘ Desktop PC's Operating Syst
☐ ⓘ Desktop PC's Middleware
☐ ⓘ Desktop PC's Database
☑ ⓘ Desktop PC's Applications Template Requirements

| Check | Count | Category | ID |
|---|---|---|---|
| | 1 | Skill | 1714 |
| | 2 | Skill | 1720 |
| | 3 | Skill | 1722 |
| | 4 | Skill | 1731 |
| | 5 | Skill | 1886 |
| • | 6 | Skill | 1979 |
| • | 7 | Skill | 1980 |
| • | 8 | Skill | 1982 |
| | 9 | Skill | 1894 |
| | 10 | Skill | 1985 |
| | 11 | Skill | 1986 |
| | 12 | Skill | 1991 |

▣ Problem Management
☐ ⊞ Define Change Request
☐ ⊞ Approve Change Request
☑ ⊞ Develop Change Package
☐ ⊞ Test Change Package Dep
☐ ⊞ Schedule & Consolidate C
☐ ⊞ Communicate the Change
☐ ⊞ Distribute Change
☐ ⊞ Implement Change
☐ ⊞ Backout Change
☐ ⊞ Complete Change Reques
☐ ⊞ Improve the Change Mana Working Requirements

| Check | Count | Category | ID |
|---|---|---|---|
| | 1 | Skill | 1886 |
| | 2 | Skill | 1980 |
| | 3 | Skill | 1984 |

Stage 6: Solution Requirements
Start | VPBudd... | Exhibit... | Paint Sh... | Sys...

1) Select Working Element

2) Select the Subprocess

FIG. 23A

System Management Framework Design Tool - [Stage 6: Solution

| Requirement | Report | Exit | Help |

○ Skill
○ Tool
○ Data
○ All
W Define (Redefine) Skill Requirement
　Define (Redefine) Tool Requirement mplate Requirements

| ck | Count | Category | ID |
|---|---|---|---|
| | 1 | Skill | 12 |
| | 2 | Skill | 589 |
| | 3 | Skill | 617 |
| | 4 | Skill | 625 |
| | 5 | Skill | 641 |
| | 6 | Skill | 642 |
| | 7 | Skill | 643 |
| | 8 | Skill | 766 |
| | 9 | Skill | 767 |
| | 10 | Skill | 768 |
| | 11 | Skill | 769 |
| | 12 | Skill | 770 |
| | 13 | Skill | 771 |
| | 14 | Skill | 772 |
| | 15 | Skill | 841 |

☑ Define Change Request
☐ Approve Change Request
☐ Develop Change Package
☐ Test Change Package Dep
☐ Schedule & Consolidate C
☐ Communicate the Change
☐ Distribute Change
☐ Implement Change
☐ Backout Change
☐ Complete Change Reques
☐ Improve the Change Mana Working Requirements

| Check | Count | Category | ID |
|---|---|---|---|
| | 1 | Skill | 641 |
| | 2 | Skill | 767 |

Stage 6: Solution Requirements

| Start | VPBudd... | Exhibit... | Paint Sh... | Sys... |

1) Choose requirement Define (Redefine) Skill Requirement or Tool Requirement

[Requirements]

○ Skill ○ Tool ○ Date ⊙ All

Description
Documentation skills
Negotiation skills
Communication skills
Technical knowledge of physical infrastructure and operating
Ability to use a tool to collect data
Statistical analysis skills
Good understanding of statistical tools being used
Effective interpersonal communication skills
Knowledge of corporate business processes and practices
Able to analyze problems
Able to manage workload so that all services are delivered in
Able to use problem analysis informatino to find effective solu
Understands needs and wants of the defined customer
Works well in groups
Project management skills Select
Select All
Remove
Save
Back to Main Description
Ability to use a tool to collect data
Knowledge of corporate business processes and practices Explorin... Freelan...

Results of Selection

- ☐ ⊞ Define Change Request
- ☑ ⊟ Skill Requirement
  - ☐ 1 Negotiation skills
  - ☐ 2 Ability to use a tool to collect data
  - ☐ 3 Effective interpersonal communication skills
- ☐ ⊟ Tool Requirement
  - ☐ 1 Enterprise database for logging and tracking changes
  - ☐ 2 Full text search
  - ☐ 3 Multi-user access
  - ☐ 4 Ability to attach or locate additional documentation or materials 2) Check the Skill Requirement Box Stage 7: Solution Design

| Start | VPBudd... | Exhibit... | Sys... | Explorin... | Freelan... | Paint Sh... | 10/04/2000 3:24:00 PM | 3:45 PM |

System Management Framework Design Tool - [Stage 7: Solution]

Build  Define  Report  Exit  Help

⦿ Boilerplate

○ Element-Specific

Working Process/Subprocess

☐ Problem Management
☑ Define Change Request
☐ Approve Change Request
☐ Develop Change Package
☐ Test Change Package Dep
☐ Schedule & Consolidate C
☐ Communicate the Change
☐ Distribute Change
☐ Implement Change
☐ Backout Change
☐ Complete Change Reques
☐ Improve the Change Mana ⦿ Role   ○ Tool

| Count | ID | Title |
|---|---|---|
| 1 | AUTO | AUTOMATION |
| 2 | AMCO | Application Manager |
| 3 | AMIS | Application Manager |
| 4 | ASP | Any External Service |
| 5 | BPO | Business Plan Owner |
| 6 | BUD | Backup Specialist - [ |
| 7 | BUL | Backup Specialist - [ |
| 8 | BUU | Backup Specialist - [ |
| 9 | CC | Change Co-ordinator |
| 10 | CFMRS | Configuration Reposi |
| 11 | CFMTS | Configuration Manag |
| 12 | CI | Change Implemento |
| 13 | CRC | Customer Request C |
| 14 | CS | Change Scheduler |
| 15 | CSA | Customer Serivce An |

FIG. 28A

Results of Selection

- [ ] Define Change Request
  - [✓] 1 Negotiation skills
    - [ ] AMCO Manages the day-to-day activities involved in application
    - [ ] ASP Any role which provides an IT service
    - [ ] BUD Provides support for routine backups and recovery of data
  - [ ] 2 Ability to use a tool to collect data
    - [ ] AMCO Manages the day-to-day activities involved in application
    - [ ] ASP Any role which provides an IT service
    - [ ] BUD Provides support for routine backups and recovery of data
  - [ ] 3 Effective interpersonal communication skills
    - [ ] AMCO Manages the day-to-day activities involved in application
    - [ ] ASP Any role which provides an IT service
    - [ ] BUD Provides support for routine backups and recovery of data
  - [ ] 4. Tool Requirement Stage 7: Solution Design

| Start | VPBudd... | Exhibit... | Sys... | Explorin... | Freelan... | Paint Sh... | 10/04/2000 3:24:00 PM |
|-------|-----------|------------|--------|-------------|------------|-------------|-----------------------|
|       |           |            |        |             |            |             | 3:51 PM               |

11) the roles that you selected will now be associated with the skill requirements.

System Management Framework Design Tool - [Stage 7: Solution Design]

Build  Define  Report  Exit  Help

◉ Boilerplate          ○ Role    ◉ Tool
○ Element-Specific

Working Process/Subprocess

| Count | ID | Title |
|---|---|---|
| 1 | ADM | Address Management |
| 2 | ADT | Analysis and Design |
| 3 | AMT | Asset Management |
| 4 | ACD | Automated Call Distri |
| 5 | BAR | Backup and Recover |
| 6 | ARC | Business Data Archiv |
| 7 | CTT | Call Ticket Tool |
| 8 | CMT | Change Managemen |
| 9 | CPT | Capacity Planning To |
| 10 | CST | Component Setup To |
| 11 | CFG | Configuration Manag |
| 12 | DMOD | Data Modeling Tool |
| 13 | DST | Data Salvage Tool |
| 14 | DBR | Database Backup/R |
| 15 | DBM | Database Managem |

☐ 🛢 Problem Management
☑ 🛢 Define Change Request
☐ 🛢 Approve Change Request
☐ 🛢 Develop Change Package
☐ 🛢 Test Change Package Dep
☐ 🛢 Schedule & Consolidate C
☐ 🛢 Communicate the Change
☐ 🛢 Distribute Change
☐ 🛢 Implement Change
☐ 🛢 Backout Change
☐ 🛢 Complete Change Reques
☐ 🛢 Improve the Change Mana 1) Select the Subprocess Results of Selection ☐⊟ Define Change Request
    ☐⊟ Skill Requirement
      ⊞ ☐ 1 Negotiation skills
      ⊞ ☐ 2 Ability to use a tool to collect data
      ⊞ ☐ 3 Effective interpersonal communication skills
    ☑⊟ Tool Requirement
      ⊞ ☐ 1 Enterprise database for logging and tracking changes
      ⊞ ☐ 2 Full text search
      ⊞ ☐ 3 Multi-user access
      ⊞ ☐ 4 Ability to attach or locate additional documentation or materials 2) Check the Tool Requirement Box Stage 7: Solution Design   [Start] [VPBudd...] [Exhibit...] [Syste...] [Explorin...] [Freelan...] [Paint Sh...]   10/04/2000 3:24:00 PM   3:55 PM

FIG. 29C

System Management Framework Design Tool - [Stage 7: Solution Design]

Build  Define  Report  Exit  Help

⊙ Boilerplate

○ Element-Specific

Process: Define Change Request

Tool Requirements for Tool: CMT

☑ 1. Enterprise database for logging and tracking change
☑ 2. Full text search
☑ 3. Multi-user access
☑ 4. Ability to attach or locate additional documentation or 7) The first tool you selected will appear.

8) Select the requirements you want to assign to the role.

Working Process/Subprocess

☐ 🖿 Problem Management
⊞ ☑ 🗐 Define Change Request
⊞ ☐ 🗐 Approve Change Request
⊞ ☐ 🗐 Develop Change Package
⊞ ☐ 🗐 Test Change Package Dep
⊞ ☐ 🗐 Schedule & Consolidate C
⊞ ☐ 🗐 Communicate the Change
⊞ ☐ 🗐 Distribute Change
⊞ ☐ 🗐 Implement Change
⊞ ☐ 🗐 Backout Change
⊞ ☐ 🗐 Complete Change Reques
⊞ ☐ 🗐 Improve the Change Mana

FIG. 30A

| | System Management Framework Design Tool - [Stage 7: Solution Design] |
|---|---|

Build  Define  Report  Exit  Help

○ Boilerplate

○ Role  ⦿ Tool

○ Element-Specific

Working Process/Subprocess

| Count | ID | Title |
|---|---|---|
| 1 | ADM | Address Management |
| 2 | ADT | Analysis and Design |
| 3 | AMT | Asset Management |
| 4 | ACD | Automated Call Distri |
| 5 | BAR | Backup and Recover |
| 6 | ARC | Business Data Archiv |
| 7 | CTT | Call Ticket Tool |
| 8 | CMT | Change Managemen |
| 9 | CPT | Capacity Planning To |
| 10 | CST | Component Setup To |
| 11 | CFG | Configuration Manag |
| 12 | DMOD | Data Modeling Tool |
| 13 | DST | Data Salvage Tool |
| 14 | DBR | Database Backup/R |
| 15 | DBM | Database Managem |

☐ Problem Management
☑ Define Change Request
☐ Approve Change Request
☐ Develop Change Package
☐ Test Change Package Dep
☐ Schedule & Consolidate C
☐ Communicate the Change
☐ Distribute Change
☐ Implement Change
☐ Backout Change
☐ Complete Change Reques
☐ Improve the Change Mana

FIG. 31A

Results of Selection

- ☐ ⊞ Define Change Request
  - ☐ ⊞ Skill Requirement
    - ☐ 1 Negotiation skills
    - ☐ 2 Ability to use a tool to collect data
    - ☐ 3 Effective interpersonal communication skills
  - ☑ ⊟ Tool Requirement
    - ☐ 1 Enterprise database for logging and tracking changes
      - ☐ CMT: Automated facility for entering, updating, tracking and
    - ☐ 2 Full text search
      - ☐ CMT: Automated facility for entering, updating, tracking and
    - ☐ 3 Multi-user access
      - ☐ CMT: Automated facility for entering, updating, tracking and
    - ☐ 4 Ability to attach or locate additional documentation or materials
      - ☐ CMT: Automated facility for entering, updating, tracking and Stage 7: Solution Design

[Start] [VPBudd...] [Exhibit...] [Syste...] [Explorin...] [Freelan...] [Paint Sh...]   10/04/2000 3:24:00 PM   3:59 PM 11) The tools that you selected will now be associated with the tool requirements.

FIG. 31C

- Process (Subprocess ID, SubProcess Title, Goals, Scope, tasks)

- Element Axis (Print out the three Components of the element axis) Roles Glossary (Generic Role ID, Title, Description)

- Data Glossary (Generic Data Products Skill Requirements by Subprocess (Subprocess Title, List of Skill Requirements assigned to that Subproces) and Element

- Tool Requirements by Subprocess (Subprocess Title, List of Tool Requirements assigned to that Subprocess) by Element

- Data Requirements by Subprocess (Subprocess Title, List of Tool Requirements assigned to that Subprocess) by Element

- Role Definition Report (Role Title, Description, Location, Subprocesses assigned, elements assigned, skill requirements assigned)

- Tool Definition Report (Tool Title, Description, Locatin, Subprocesses assigned, elements assigned, tool requirements assigned).

- Roles assigned to a Subprocess (Role Title, Subprocess Assigned)

- Tools assigned to a Subprocess (Tool Title, Subprocess Assigned)

FIG. 33

SYSTEM AND METHOD FOR IDENTIFYING SKILLS AND TOOLS NEEDED TO SUPPORT A PROCESS UTILIZING PRE-DEFINED TEMPLATES

BACKGROUND OF THE INVENTION

1. Field of the Invention

This invention generally relates to methods and systems to help solve business problems. More specifically, the invention relates to methods and systems to identify the specific skills and tools needed to address effectively business problems. Even more specifically, the invention relates to such methods and systems particularly well suited to assist in the design and management of business information technology infrastructures.

2. Prior Art

Many business problems are very complex. Many such problems not only involve extremely complex equipment, but also involve many different people of varying skills, educational levels and abilities. One area of business that can be particularly vexatious is the design and management of the computer infrastructure of a business. Generally, this infrastructure includes the computer and computer related equipment of a business and the way in which that equipment are connected and used together.

Over the last several years, the capabilities and importance of this infrastructure have increased very substantially. At the same time, this infrastructure has become exceedingly complicated. The design and management of this infrastructure to meet the requirements of heterogeneous technology require the definition and analysis of requirements for skills, tools and data.

SUMMARY OF THE INVENTION

An object of this invention is to provide a tool to help solve business problems.

Another object of the present invention is to provide a method and system to help design and manage the computer infrastructure of a business.

A further object of this invention is to provide a method and system with pre-established templates to help identify the skills and tools needed to solve business information technology problems.

These and other objectives are attained with a method and system to identify skills and tools needed to address a process. The method comprises the steps of storing in a computer database a series of templates identifying pre-given sub-processes, managed information technology elements, skills and tools; and accessing the computer database to use the templates to identify a set of sub-processes for a process, and to identify a set of managed elements. The set of sub-processes and the set of managed elements are used to form a matrix having a multitude of cells. The templates are also used to identify a set of skill and tool requirements for each of the cells of the matrix.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 9 generally outlines a procedure for identifying managed elements using the invention.

FIGS. 23 and 24 show display screens that may be used to add or edit skill requirements.

FIG. 33 lists some of the reports that may be generated with the preferred embodiment of the invention.

DETAILED DESCRIPTION OF THE PREFERRED EMBODIMENTS

The present invention may be used in, and as part of, a larger, overall business management system. One such system may be considered as having eight stages: (1) Engagement marketing, (2) Engagement definition, (3) Client assessment, (4) Framework design strategy, (5) Define managed elements and managed processes, (6) Define boilerplate requirements, (7) Assignment of skill and tool requirements to generic roles and tools, and (8) Generate reports. In particular, this invention may be used to perform stages (5), (6), (7) and (8).

Figure 1:
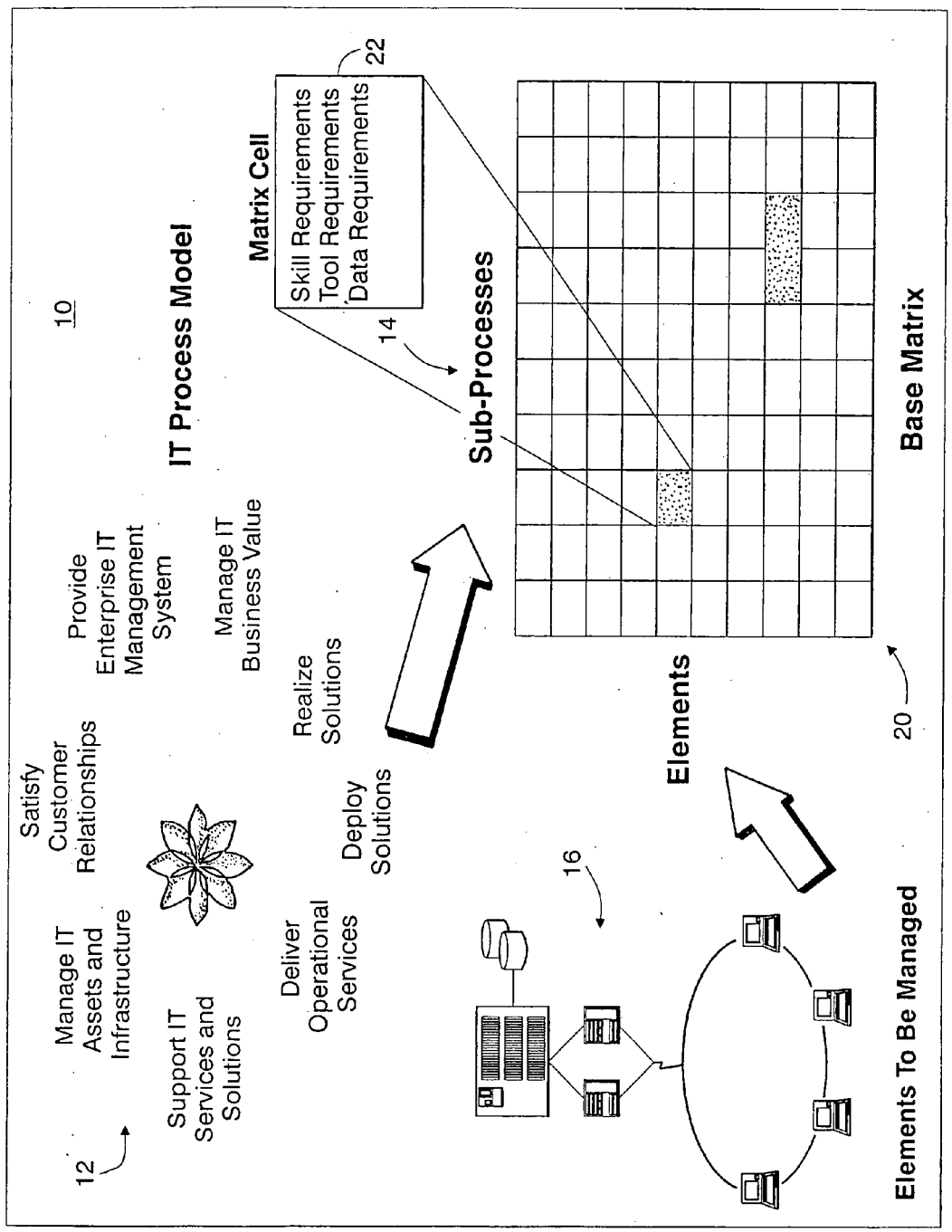
FIG. 1 generally illustrates a system management framework design that may use the present invention.

FIG. 1 generally illustrates a system management framework design 10 that may use the present invention to carry out these stages (5)–(8). More specifically, this framework 10 is used to address or to help solve a particular aspect or problem of a business. To solve the business problem, it is necessary to use a set of management processes 12.

With this framework, the process model is divided into a set of processes, each of which can be further decomposed into sub-processes 14. In addition, the physical elements 16 or equipment to be managed in, or for the purpose of addressing the business problem, are identified.

A matrix 20 is then formed, with the sub-processes listed along one axis of the matrix, and the elements to be managed listed along the other axis. As shown in FIG. 1, these elements identify the rows of the matrix, and the sub-processes identify the columns of the matrix. The individual cells 22 of the matrix are used to list or to identify the specific skills, tools and data required to manage the particular element that identifies the row in which the cell is located, in the manner needed to achieve or to address the specific sub-process that identifies the column in which the cell is located.

In accordance with the present invention, templates are provided that pre-identify sets of sub-processes, sets of managed elements, sets of skill requirements, and sets of tool requirements. Templates are also provided that pre-identify sets of generic roles and generic tools. These templates are used to help form the working sets of tools and skills appropriate for a particular infrastructure management design, and to help identify the skill and tools for each cell of the base matrix.

Figure 2:
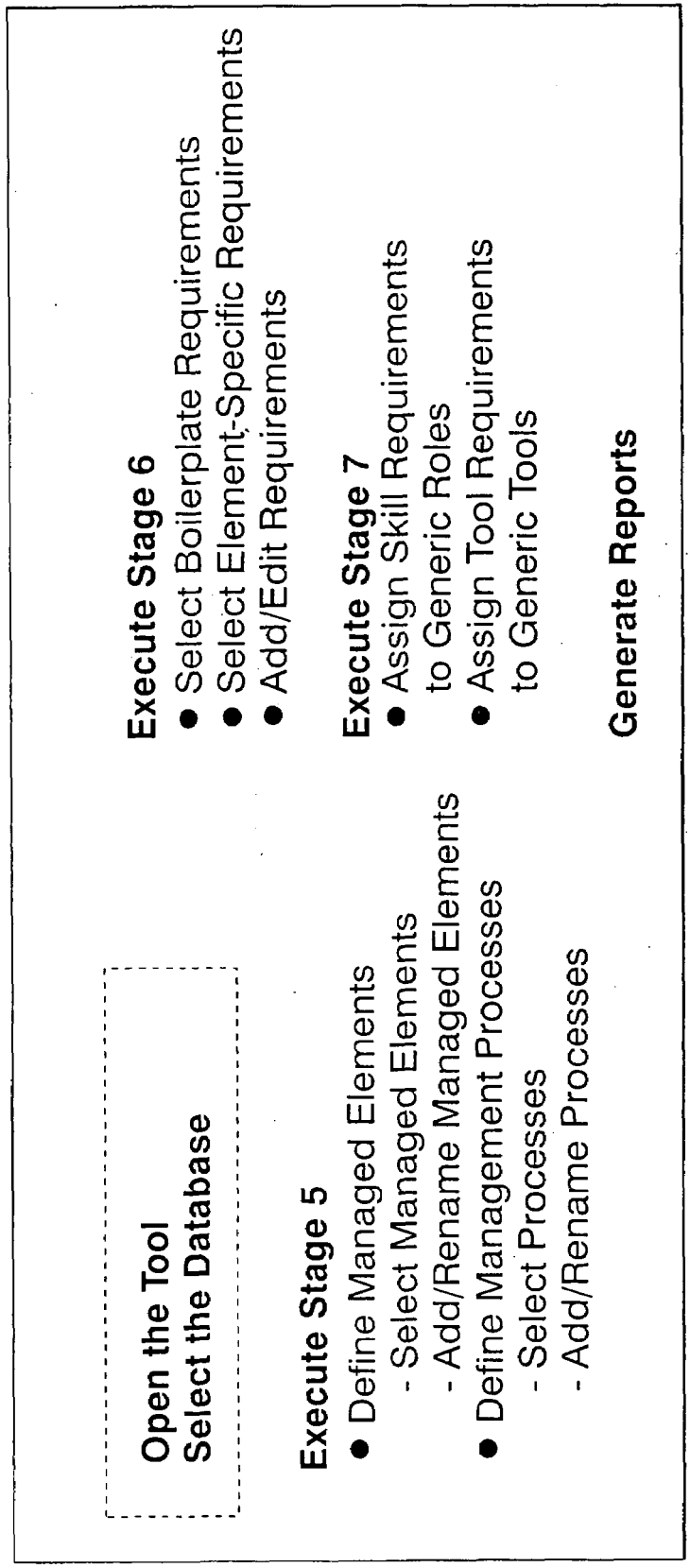
FIG. 2 indicates particular design stages that may use this invention.
Figure 3:
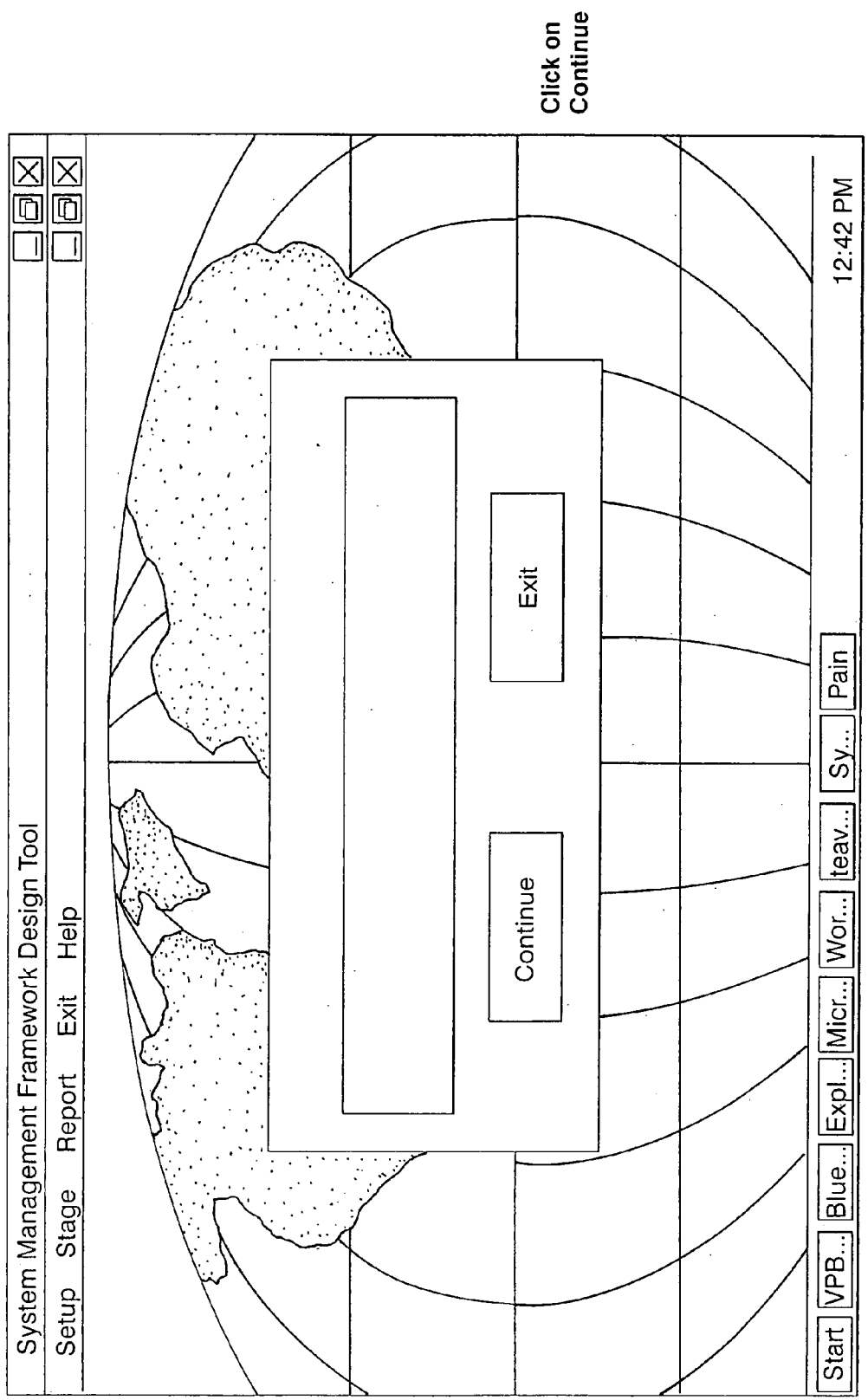
FIGS. 3 and 4 illustrate display screens that may be shown in the initial steps of the implementation of the invention.
Figure 4:
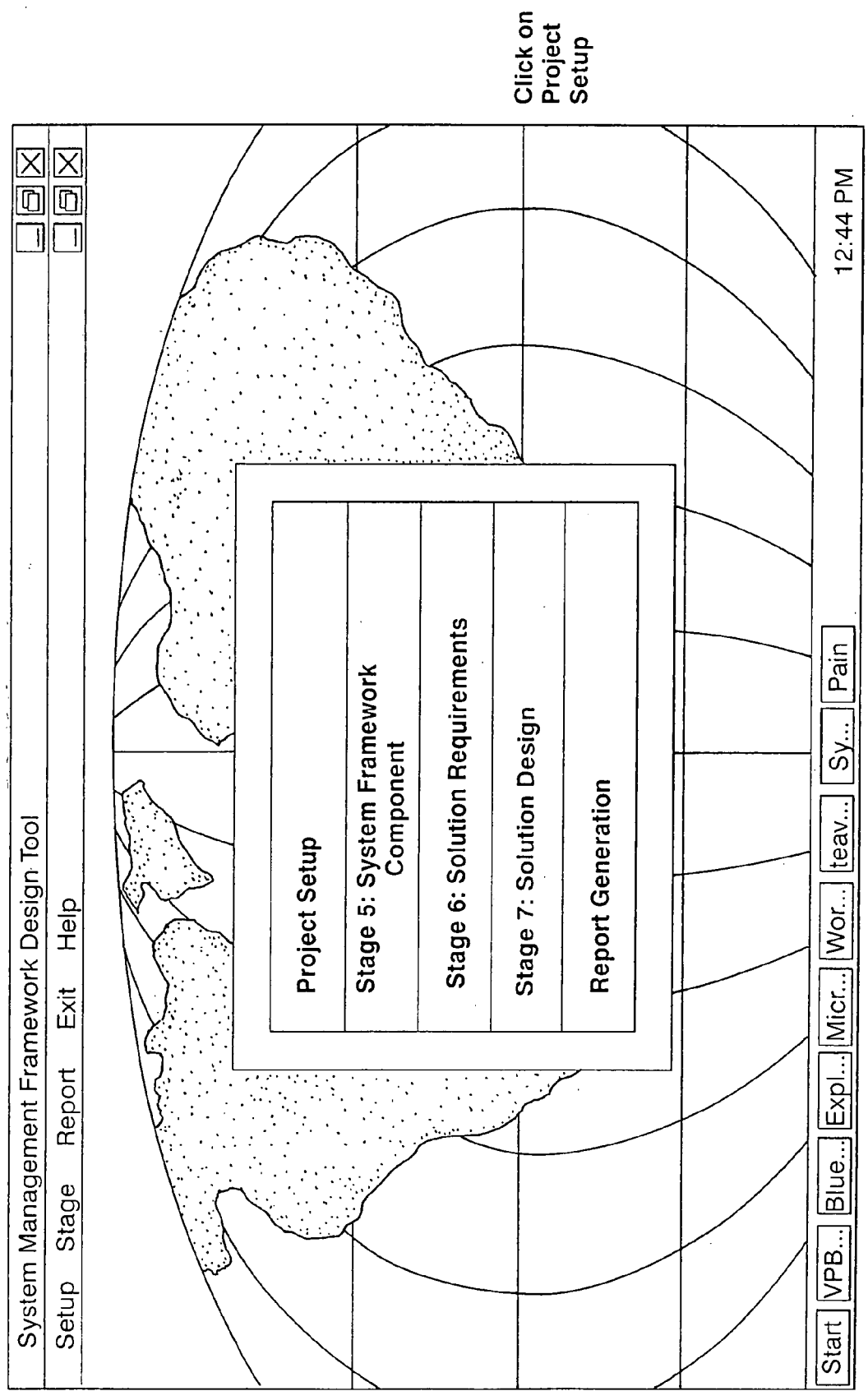

With reference to FIG. 2, the initial steps in the implementation of this invention are to open the tool and to select the database—that is, to obtain access to the templates used in the invention and to the software used to perform the invention. FIGS. 3 and 4 illustrate two screen displays that may be shown during these initial steps.

Figure 5:
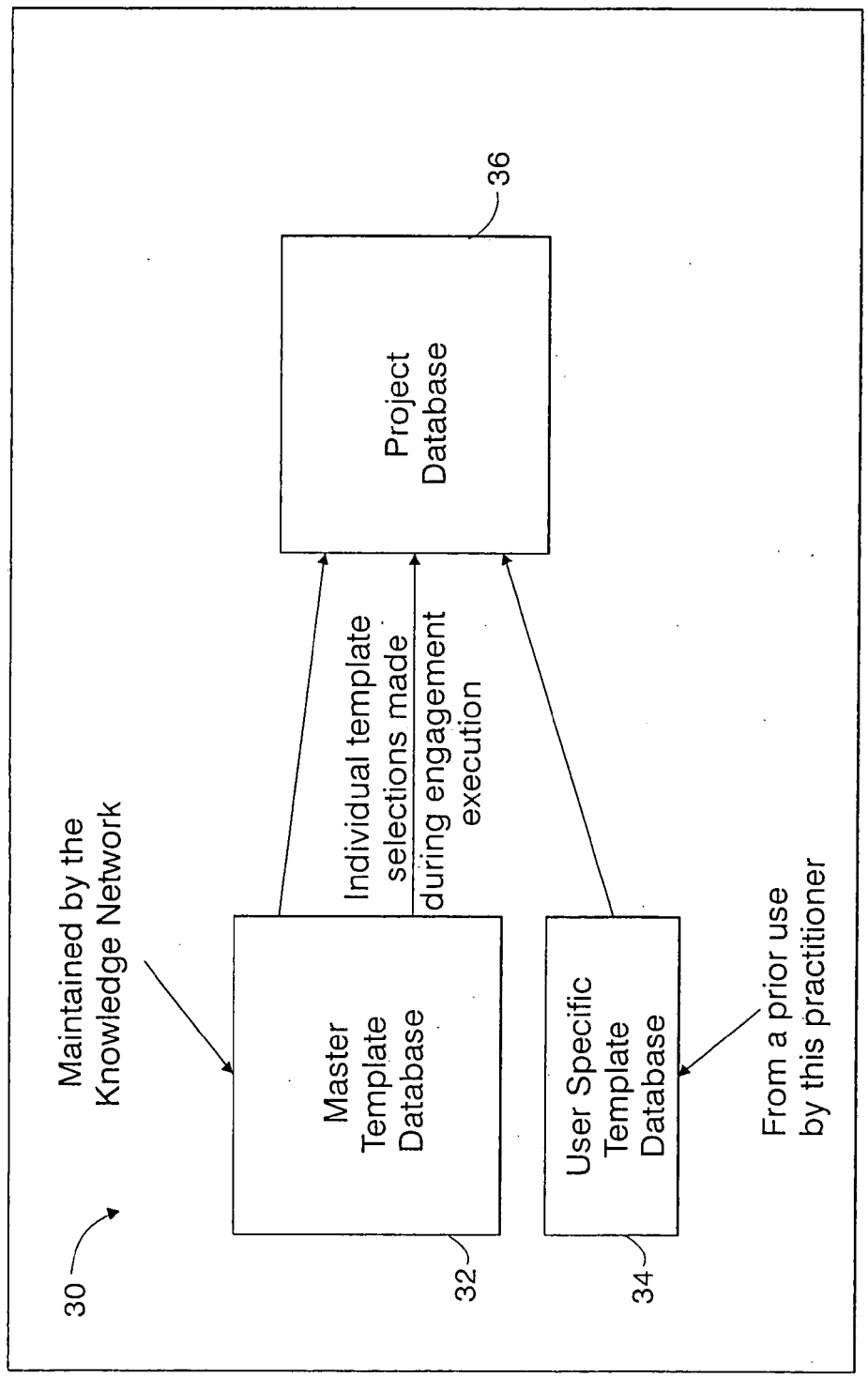
FIG. 5 show databases that may be used in the practice of this invention.
Figure 6:
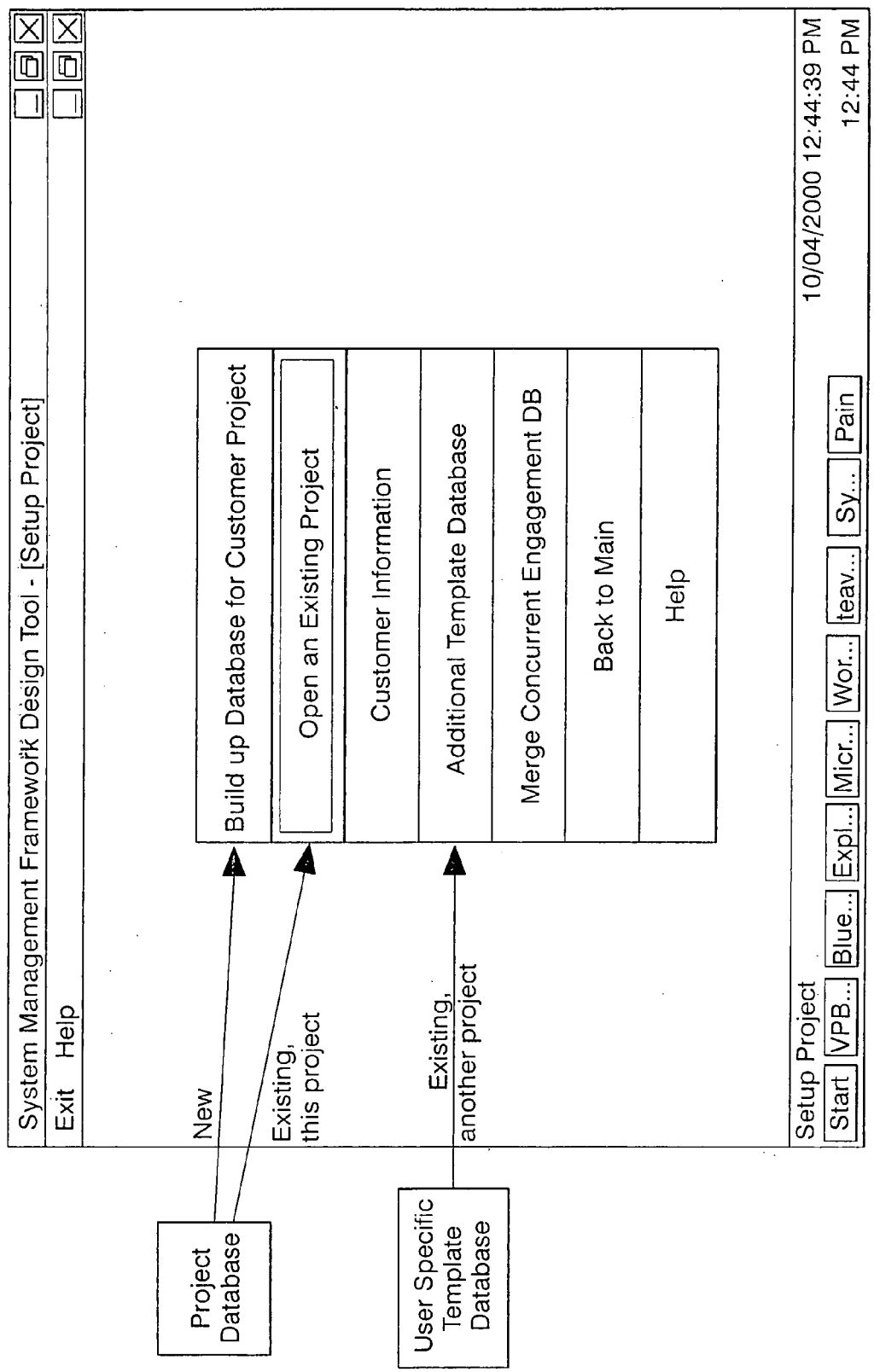
FIG. 6 shows a display screen that may be used to select the databases of FIG. 5.

Preferably, and with reference to FIGS. 5 and 6, the database 30 includes two component databases: a master template database 32, and a user specific template database 34. The master template database may be accessed by all the users of the system and may include all the templates stored and provided by a system administrator or similar central authority. The user specific template database may include templates previously developed by a particular user. As illustrated in FIG. 5, templates from these two component databases are used to form a project database 36 for the specific project on which the user is working.

Figure 7:
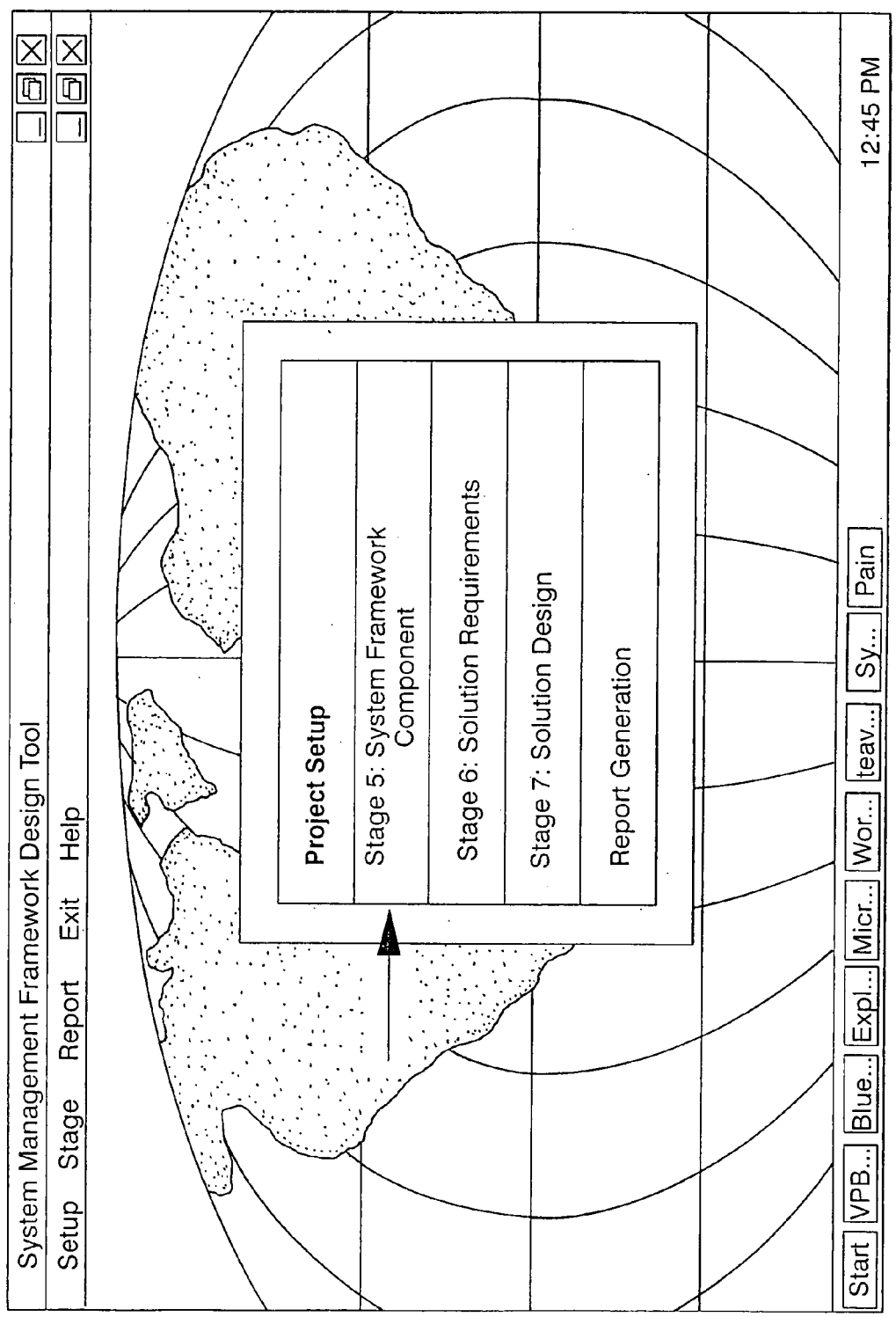
FIGS. 7 and 8 show a display screens that may be used to start a particular stage of the implementation of this invention.
Figure 8:
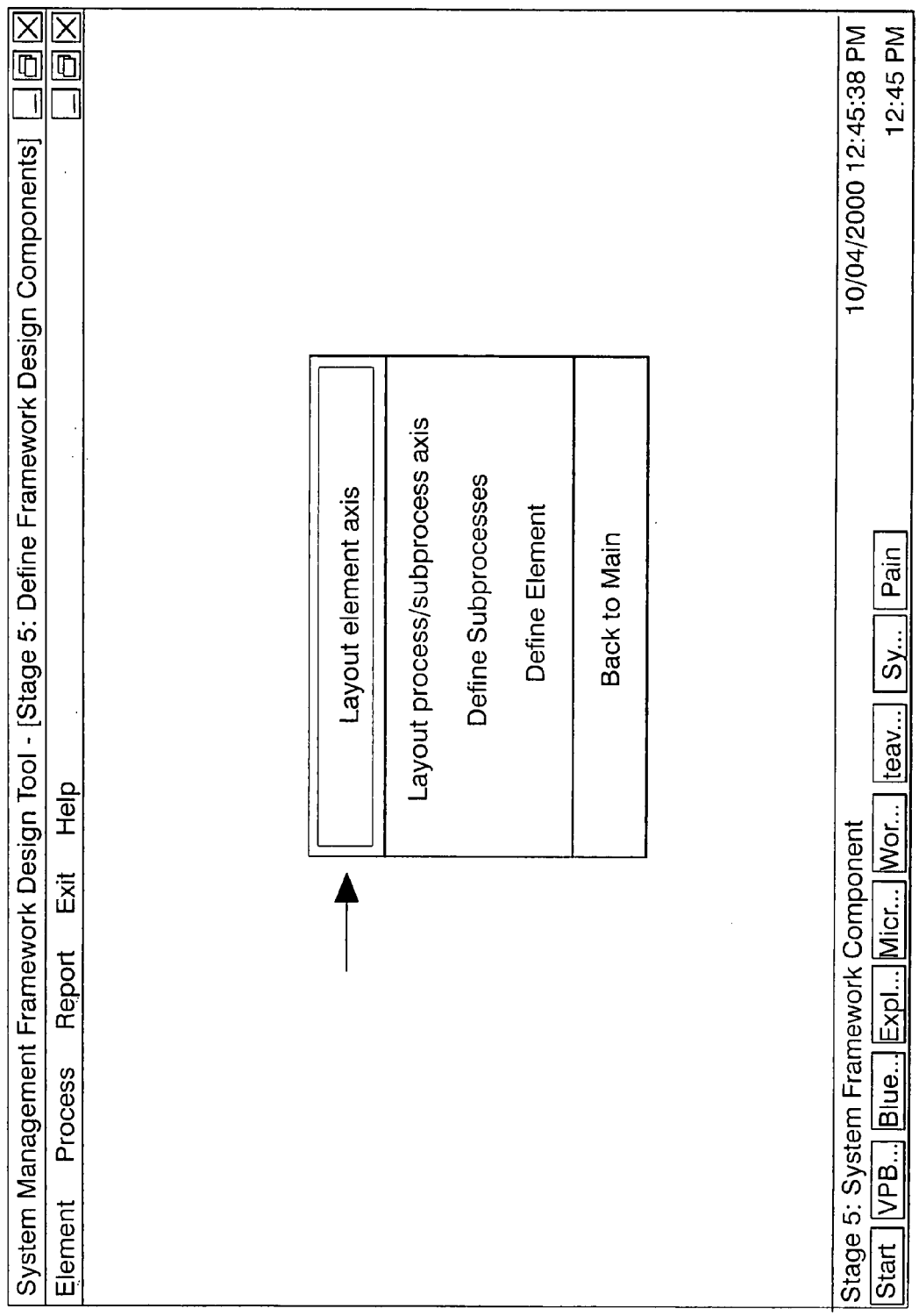
Figure 10A:
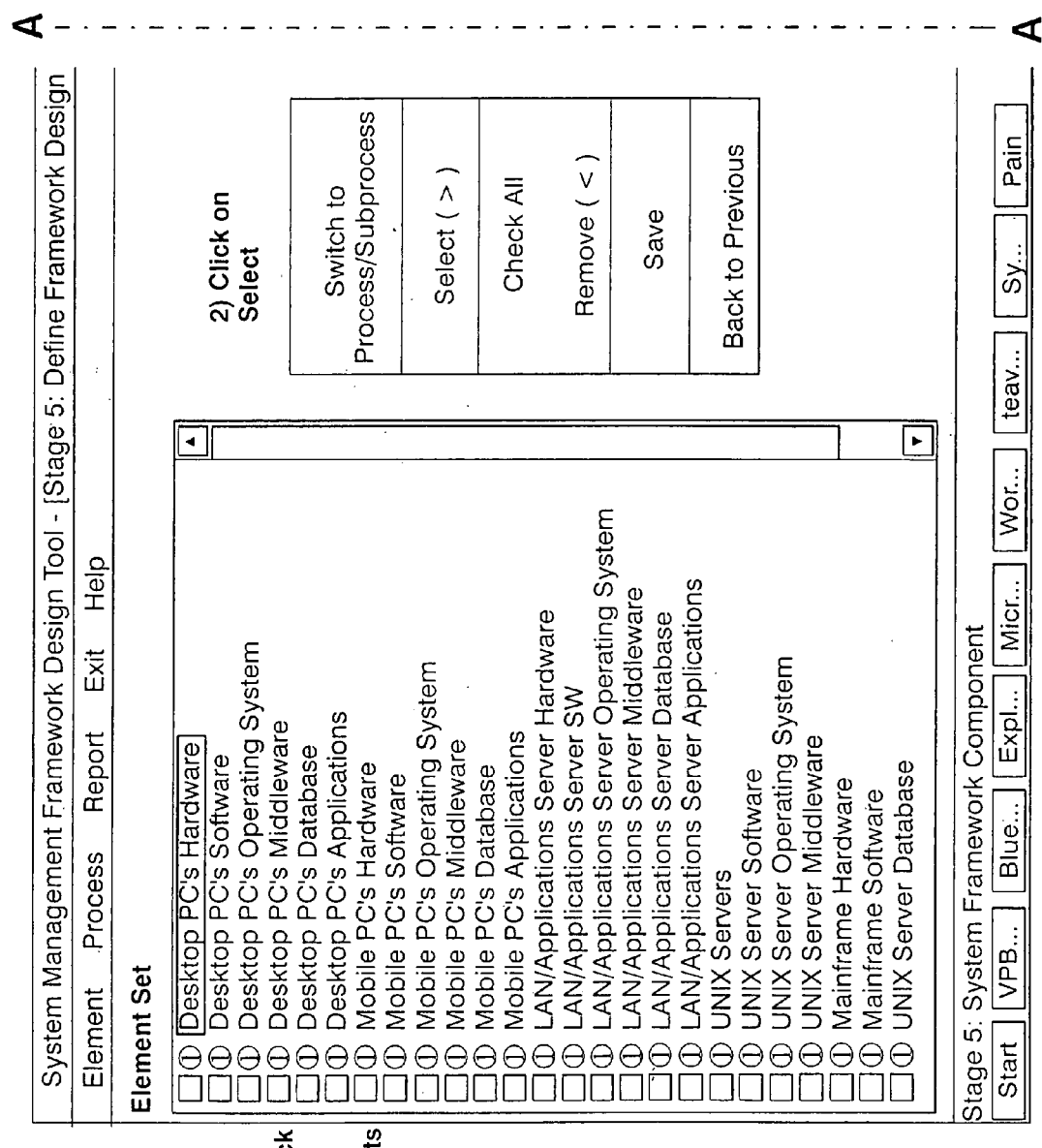
FIGS. 10–13 illustrate display screens that may be shown and used in the procedure for identifying the managed elements.
Figure 11A:
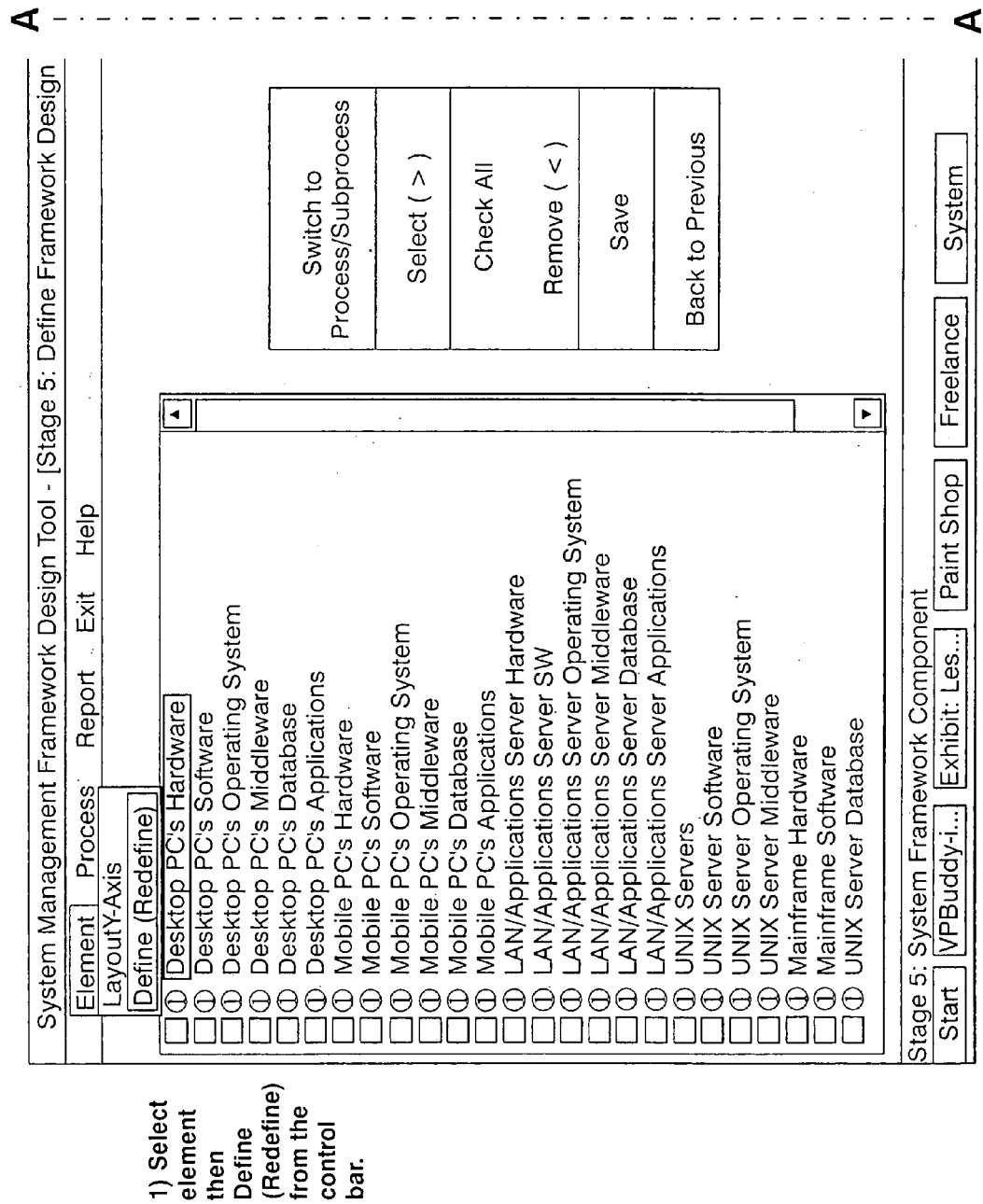
Figure 12B:
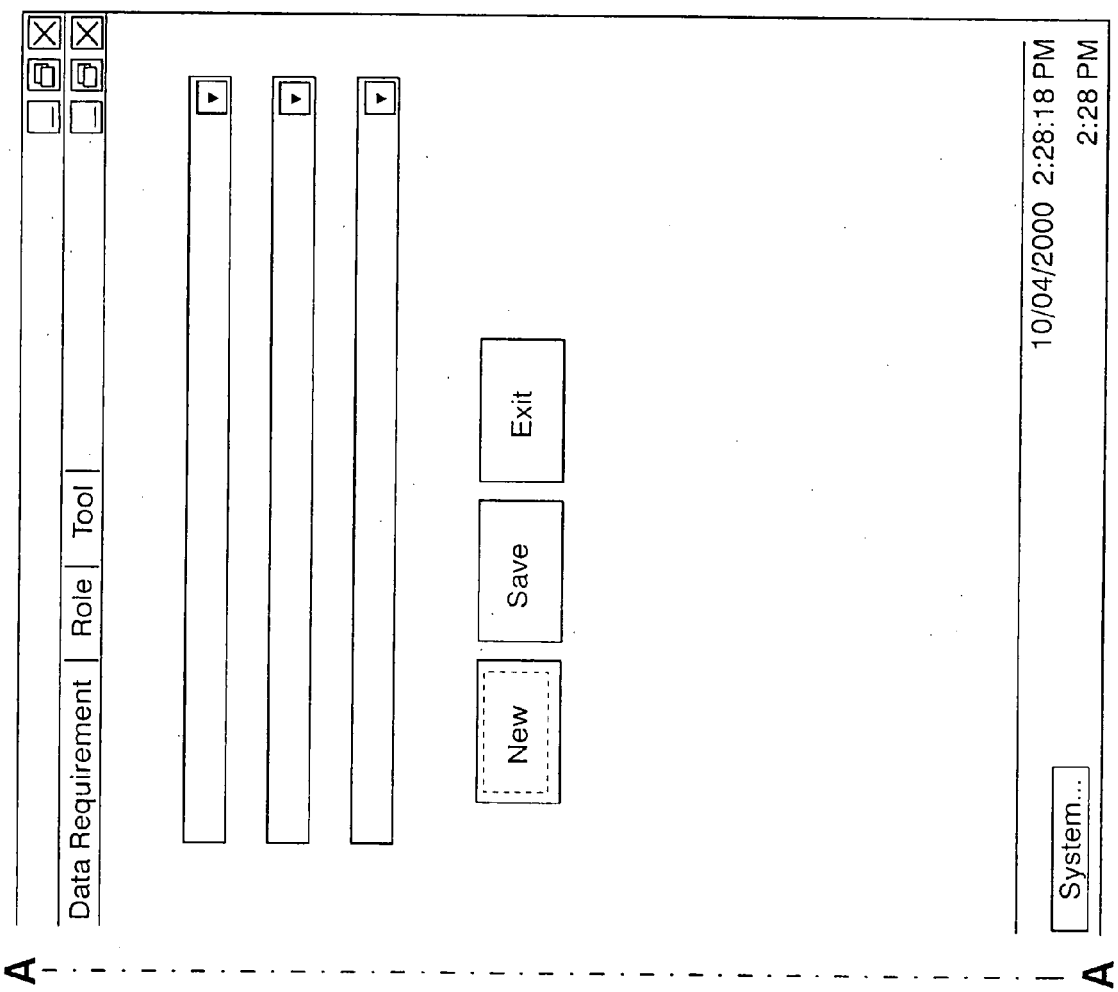
Figure 13B:
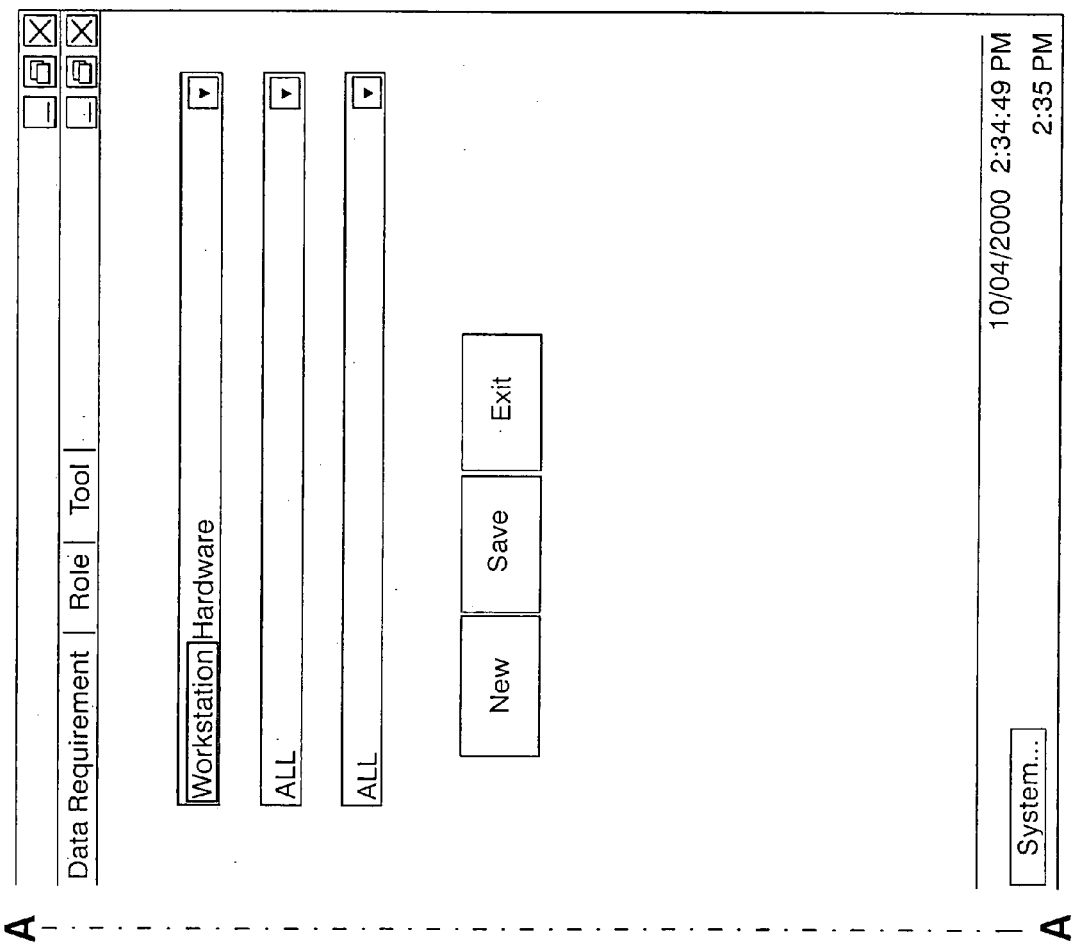

Once the database 30 is opened, the next steps, as represented in FIG. 7, are to define the managed elements and the management sub-processes. FIG. 8 is a display screen that may be shown to initiate the procedure to define the managed elements. With reference to FIGS. 7–9, to define these elements, selections are made using a pre-given set of managed elements. This set is displayed, for example as shown in FIG. 10, and the user then selects from this list the desired elements to form a working set of managed elements. Preferably the practitioner then has the options of renaming elements of this working set and of adding elements to the set to form a final working set. FIGS. 11, 12 and 13 are display screens that may be shown and used to help in these adding and re-naming procedures.

Figure 14:
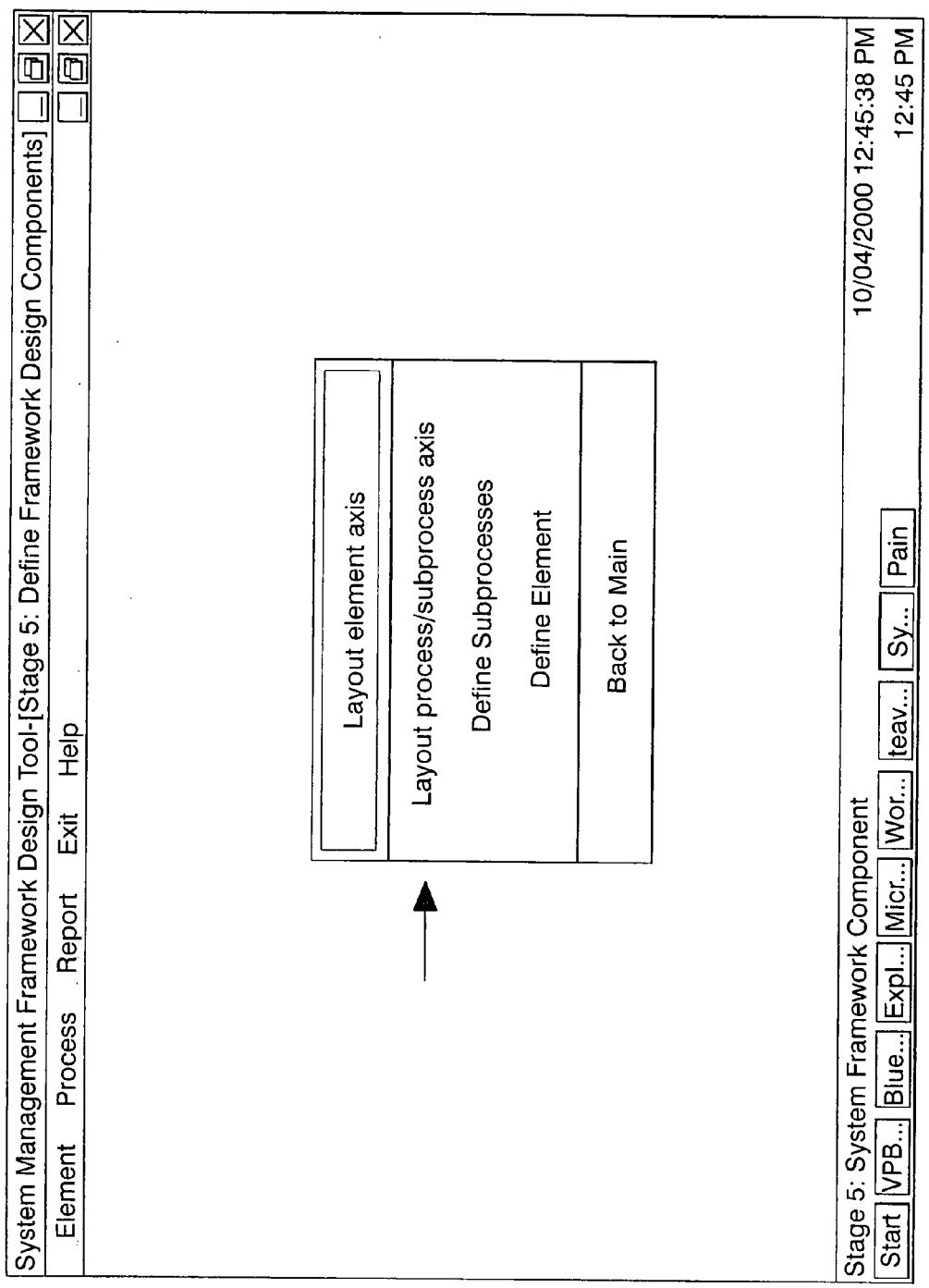
FIG. 14 shows a display screen that may be used to start a procedure for identifying management sub-processes.
Figure 15:
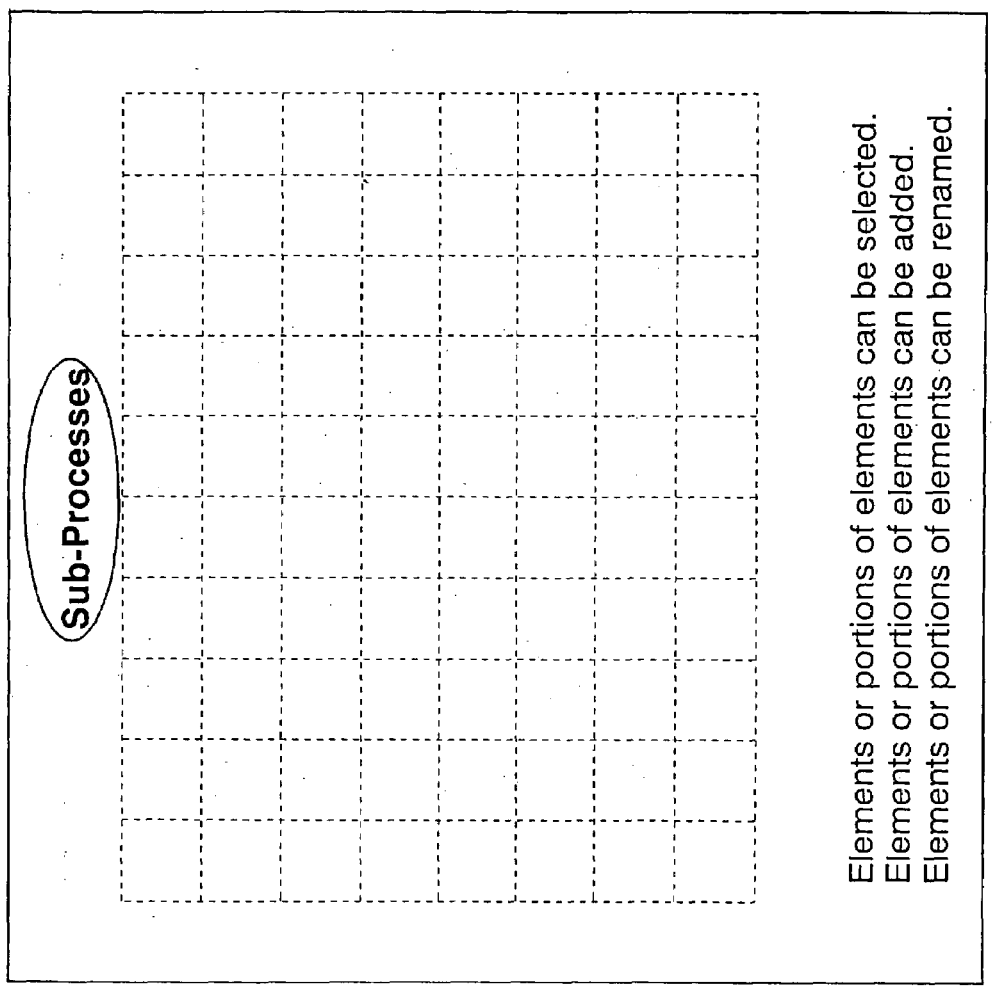
FIG. 15 generally outlines a procedure for identifying managed sub-processes using the invention.
Figure 16A:
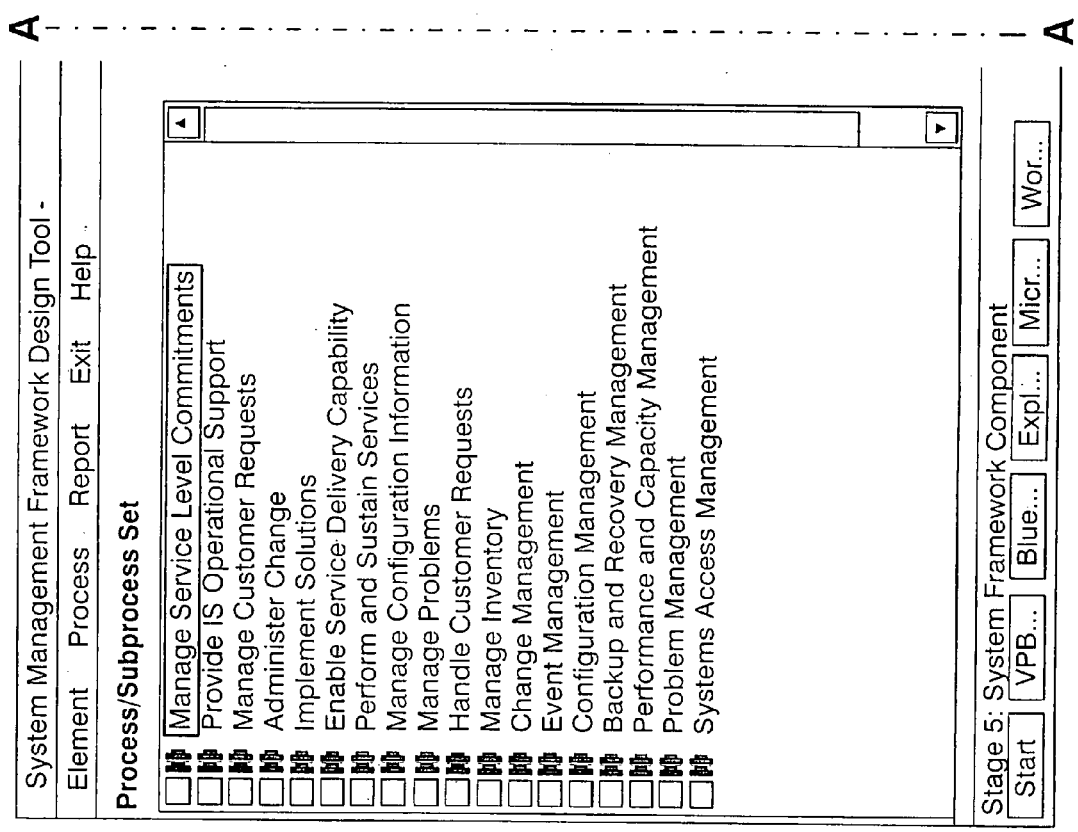
FIGS. 16–18 show display screens that may be shown and used in the procedure for identifying the managed sub-processes.
Figure 16B:
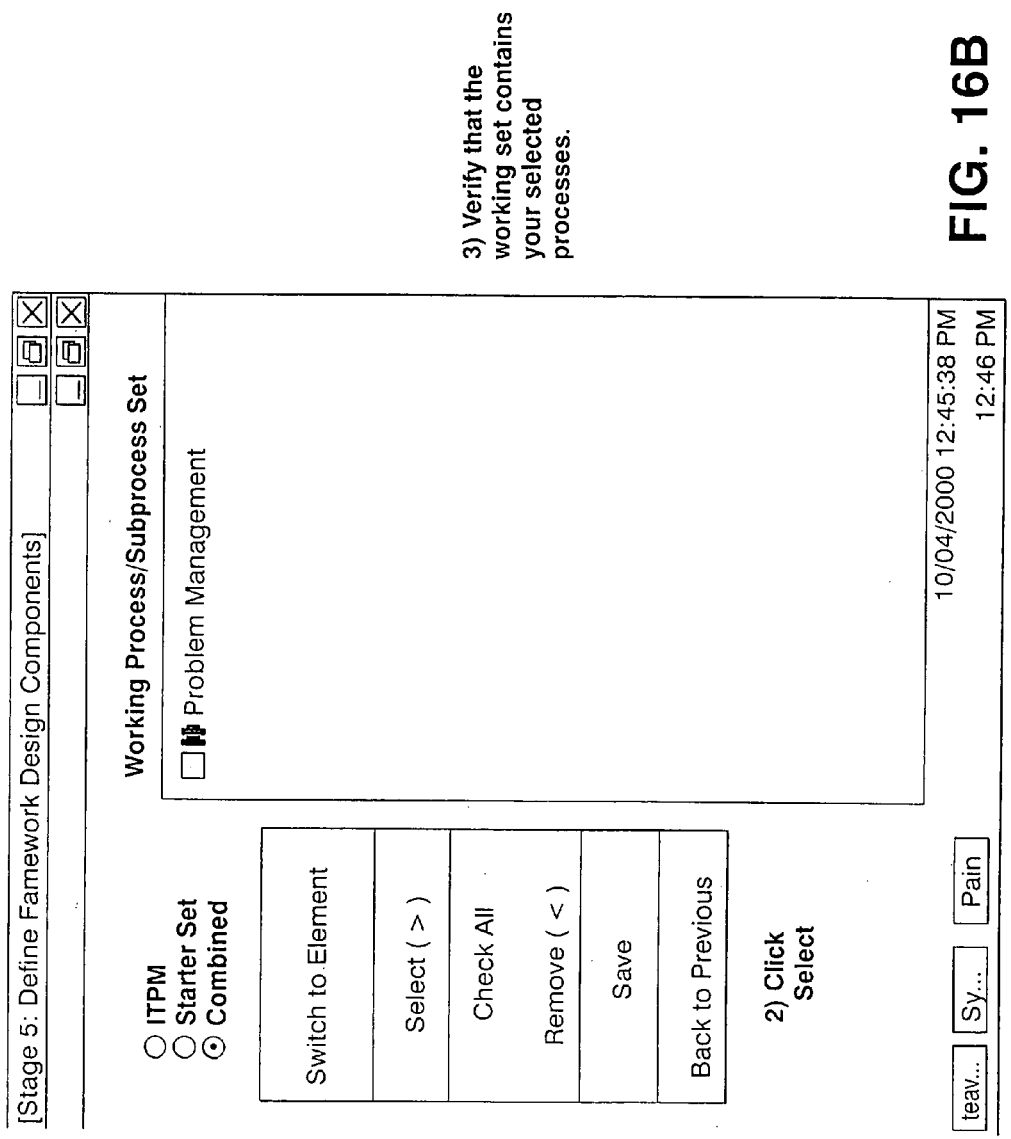
Figure 17A:
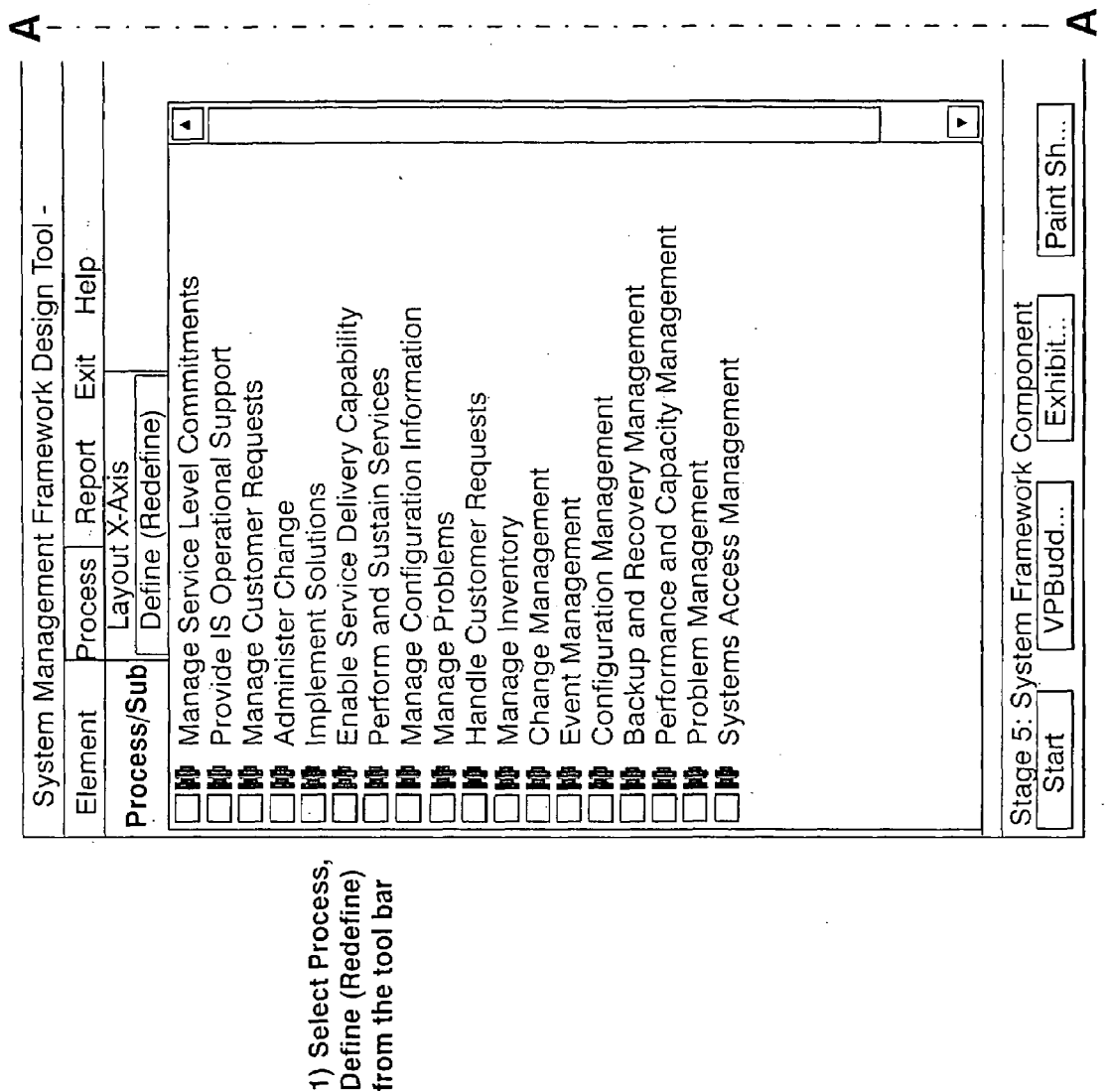
Figure 17B:
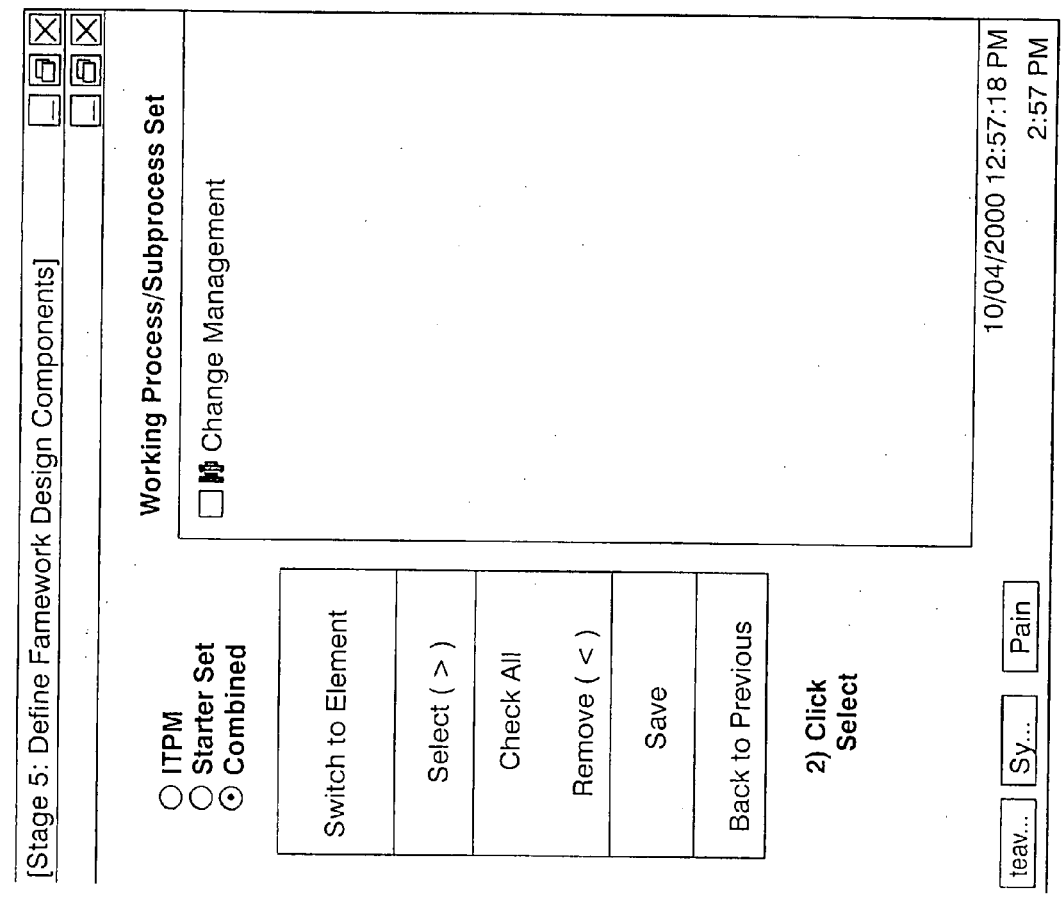
Figure 18B:
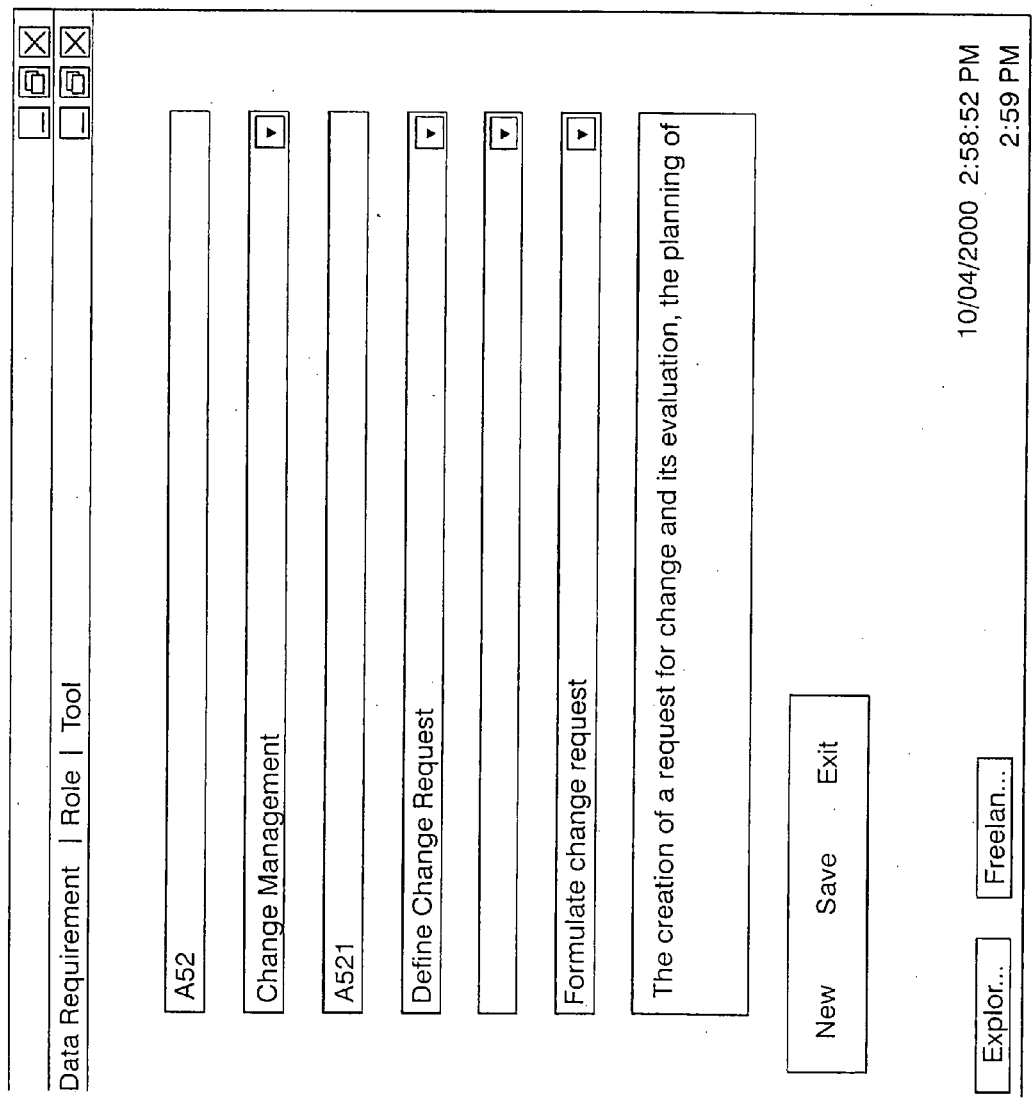

A similar procedure may be used to define the management sub-processes. FIG. 14 depicts a display screen that may be shown to initiate this procedure, which is generally outlined in FIG. 15. With reference to FIG. 16, the database 30 contains a pre-given set of management sub-processes. This set is displayed, and the user selects from this list the desired sub-processes to form a working set. Preferably, the user has the options of re-naming the sub-processes in this working set and of adding sub-processes to the set to form a final working set of sub-processes. FIGS. 17 and 18 illustrate display screens that may be shown and used to help in the adding and re-naming procedures.

Figure 19:
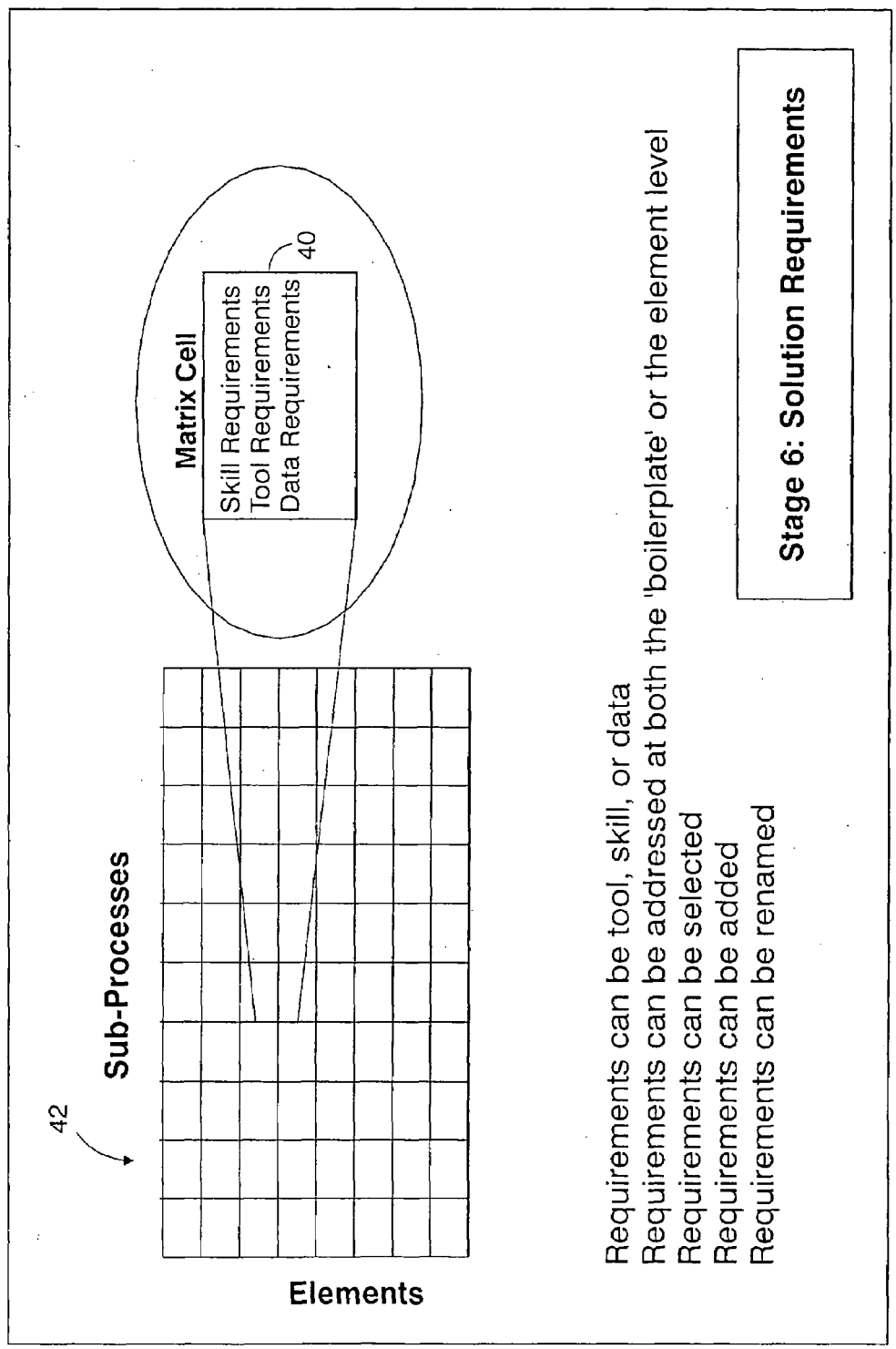
FIG. 19 generally outlines a procedure for modifying certain template requirements using the invention.
Figure 20:
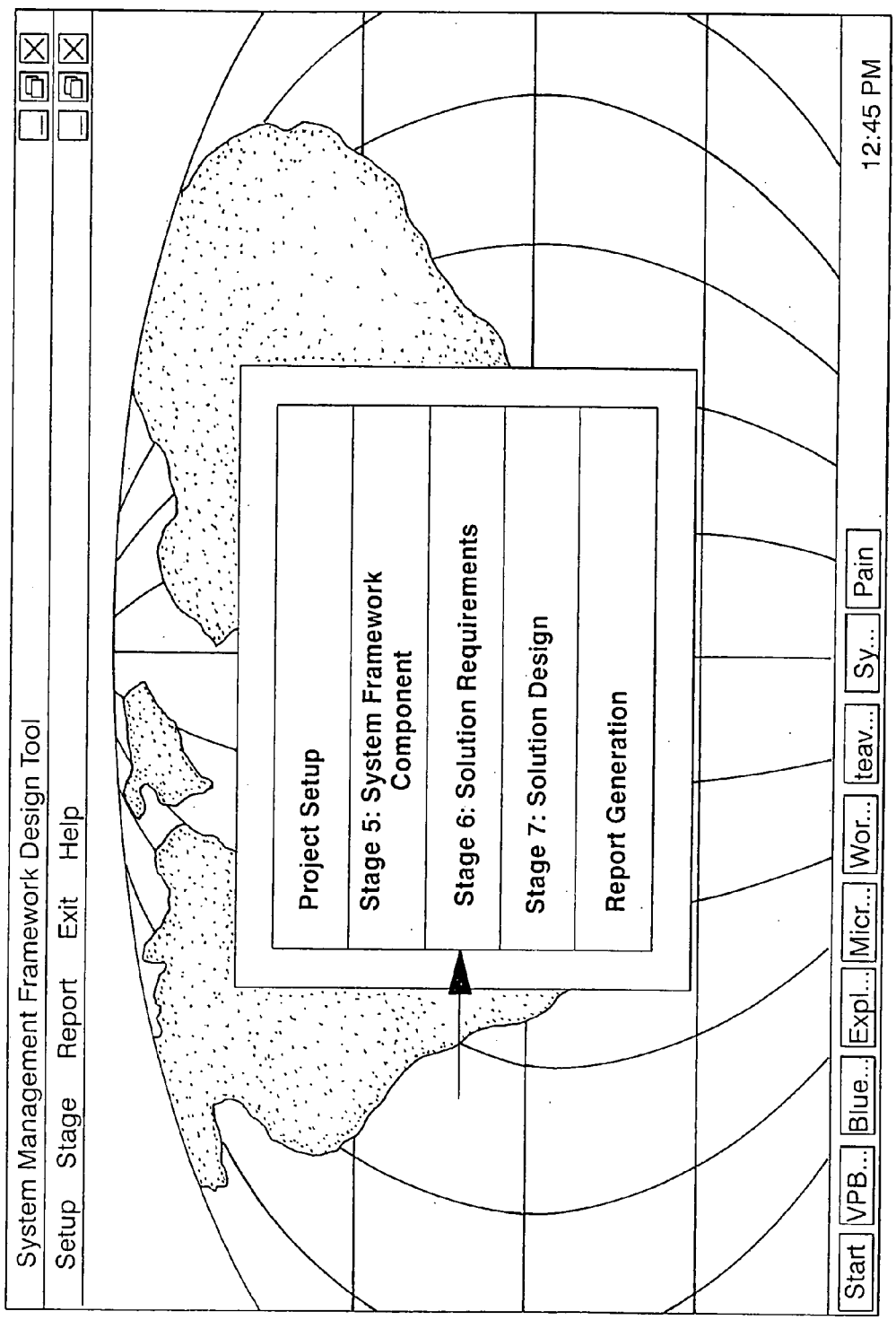
FIG. 20 illustrates a display screen that may be shown to start a procedure for modifying template requirements.

With reference to FIG. 19, the next Stage is to define skill and tool requirements for each cell 40 of the matrix 42 formed by the final working sets of managed elements and management sub-processes. FIG. 20 shows a display screen that may be used to initiate this Stage. Preferably, the definition of these requirements is made on a sub-process by sub-process basis. For example, each sub-process has a set of pre-listed skill and tool requirements. Then for each cell in the column headed by this sub-process, the practitioner selects from this list the particular skill and tool requirements appropriate for the cell.

It has been found that for most sub-processes, all of the cells headed by the sub-process will have some common skill and tool requirements. Instead of listing these common requirements in each cell headed by the sub-process, it is preferred to list these common requirements as a separate set. These common requirements are referred to as boilerplate requirements, and the sets they form are referred to as boilerplates.

Figure 21B:
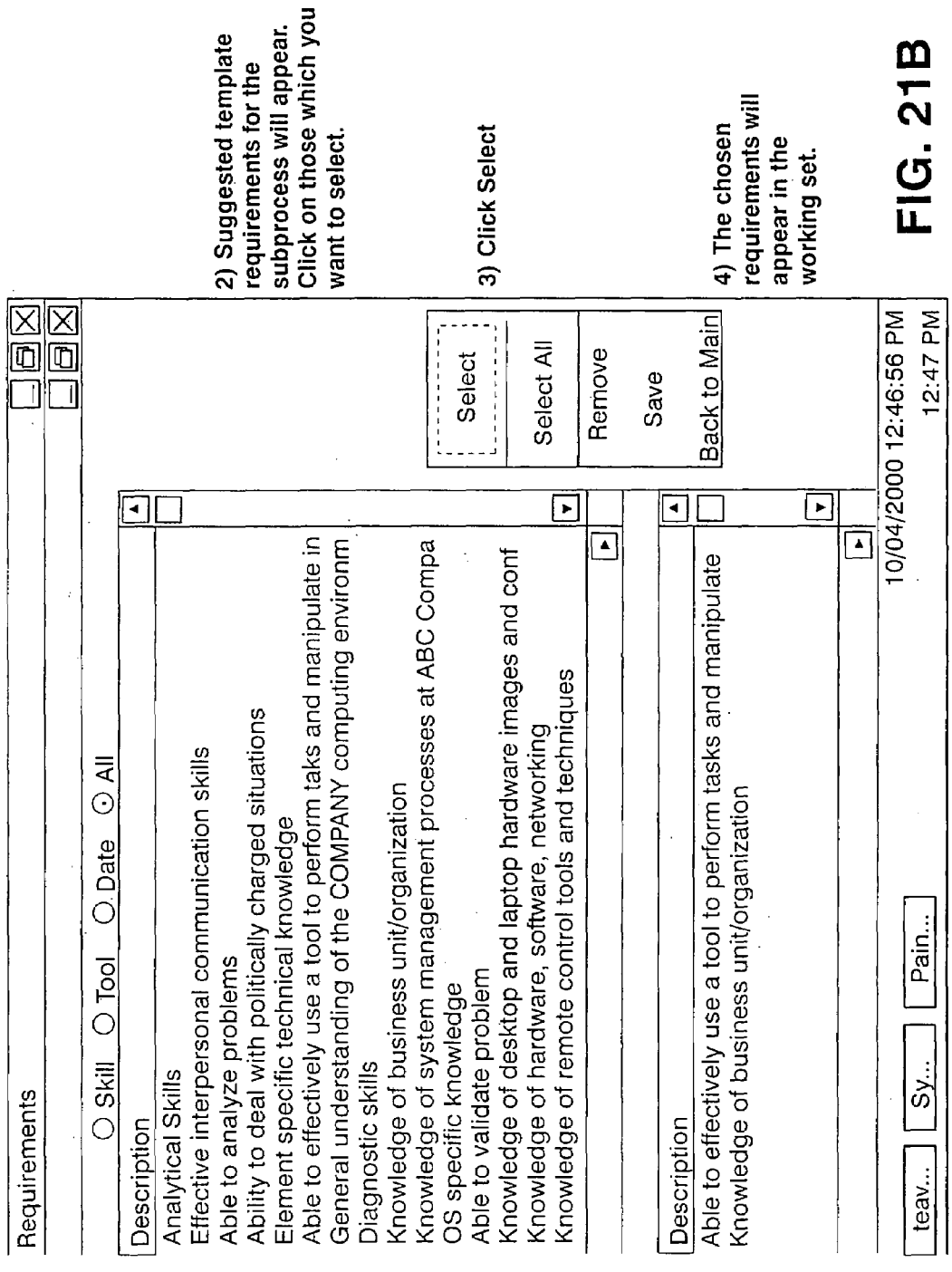
FIG. 21 shows a template referred to as a boilerplate template.

To accommodate this preferred approach, templates of pre-given boilerplate requirements are also stored in database 30; and in the preferred implementation of this Stage, for each sub-process, a boilerplate template is displayed from database 30. These requirements are displayed, as shown for example in FIG. 21, and the practitioner selects from the displayed list the set of boilerplate requirements appropriate for the sub-process.

Figure 22B:
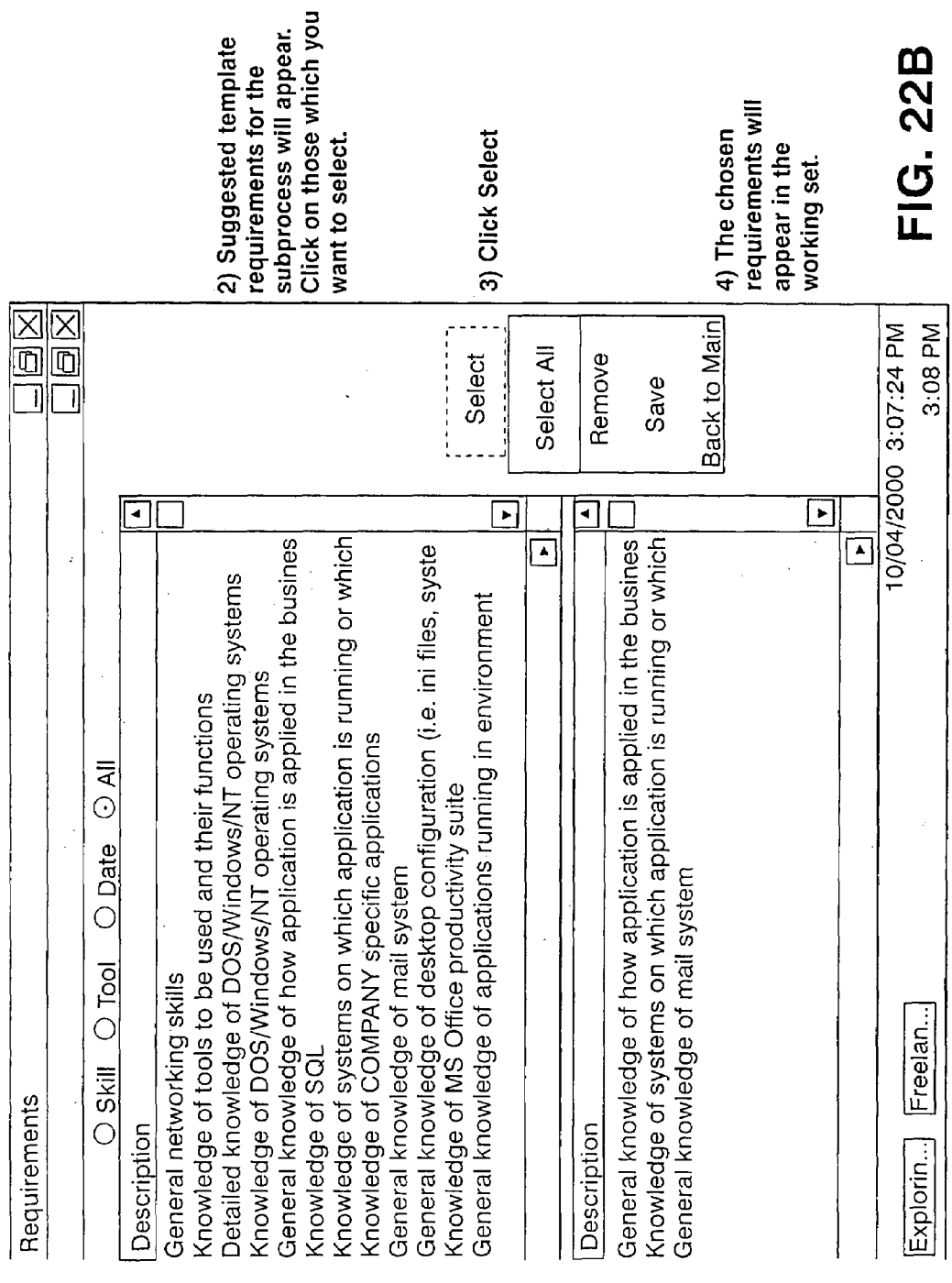
FIG. 22 shows a template of skill requirements and the method by which these requirements may be selected.
Figure 24A:
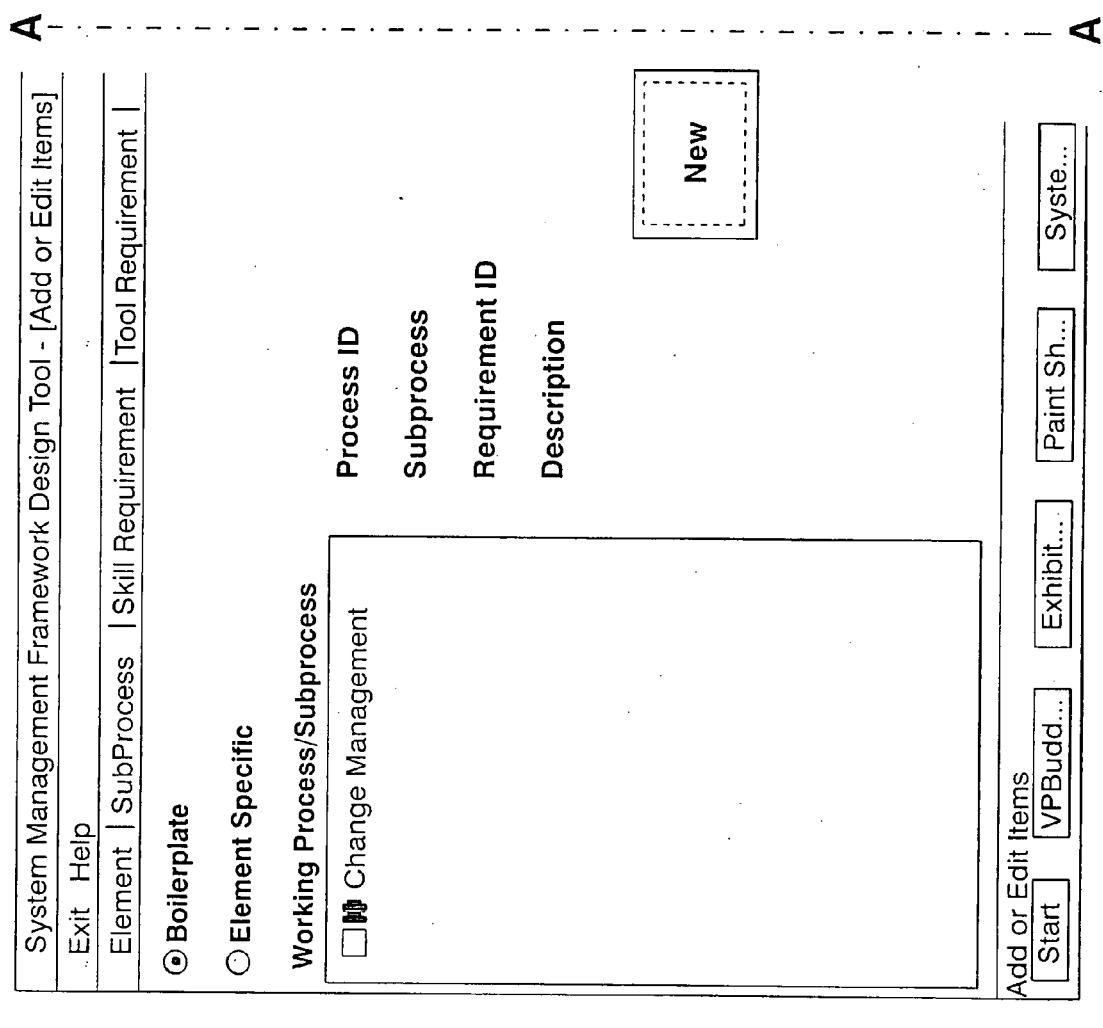
Figure 24B:
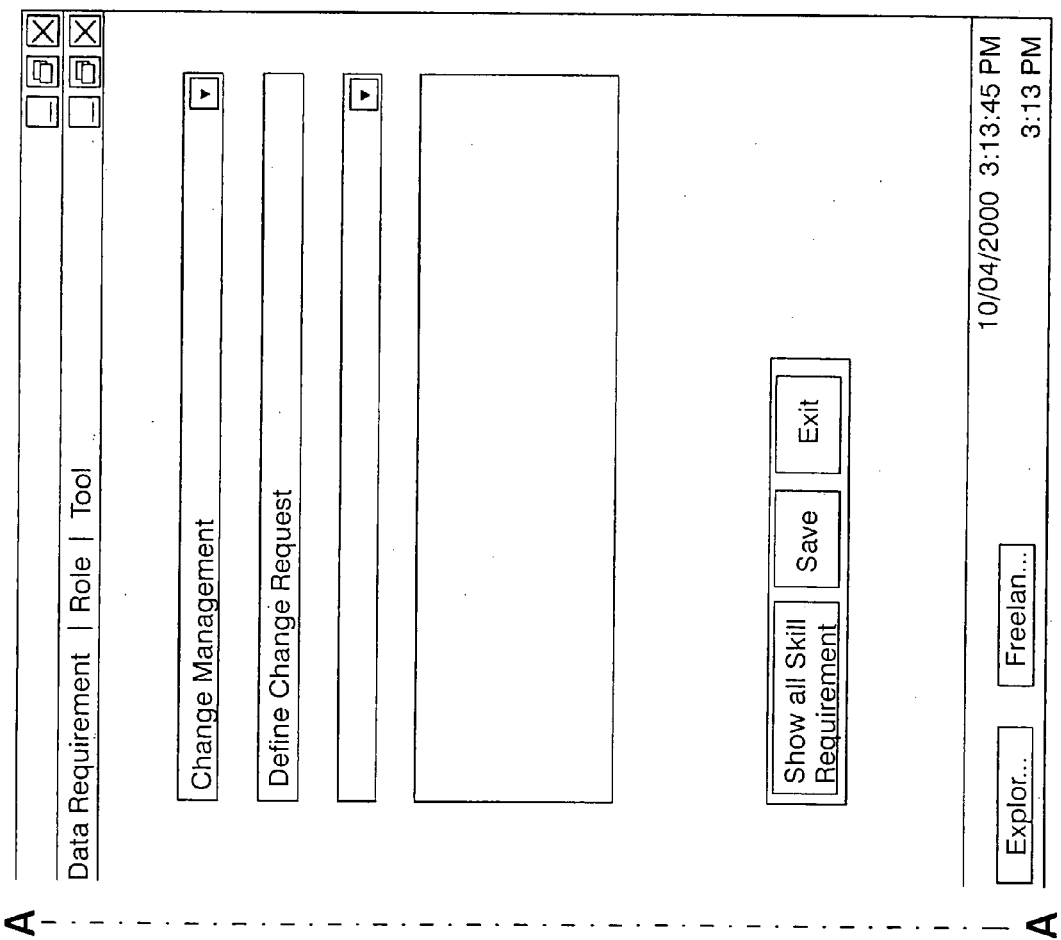

After the boilerplate requirements are defined for a sub-process, the element specific requirements are selected for each cell in the sub-process. For each of these cells, a template of pre-given requirements is obtained from database 30 and shown, for example, in FIG. 22. The practitioner then selects from this list the particular requirements appropriate for the cell. Preferably, with reference to FIGS. 23 and 24, the user has the ability to add to the list of selected requirements and to edit these requirements to form a final set of specific skill and tool requirements for the cell.

Figure 25:
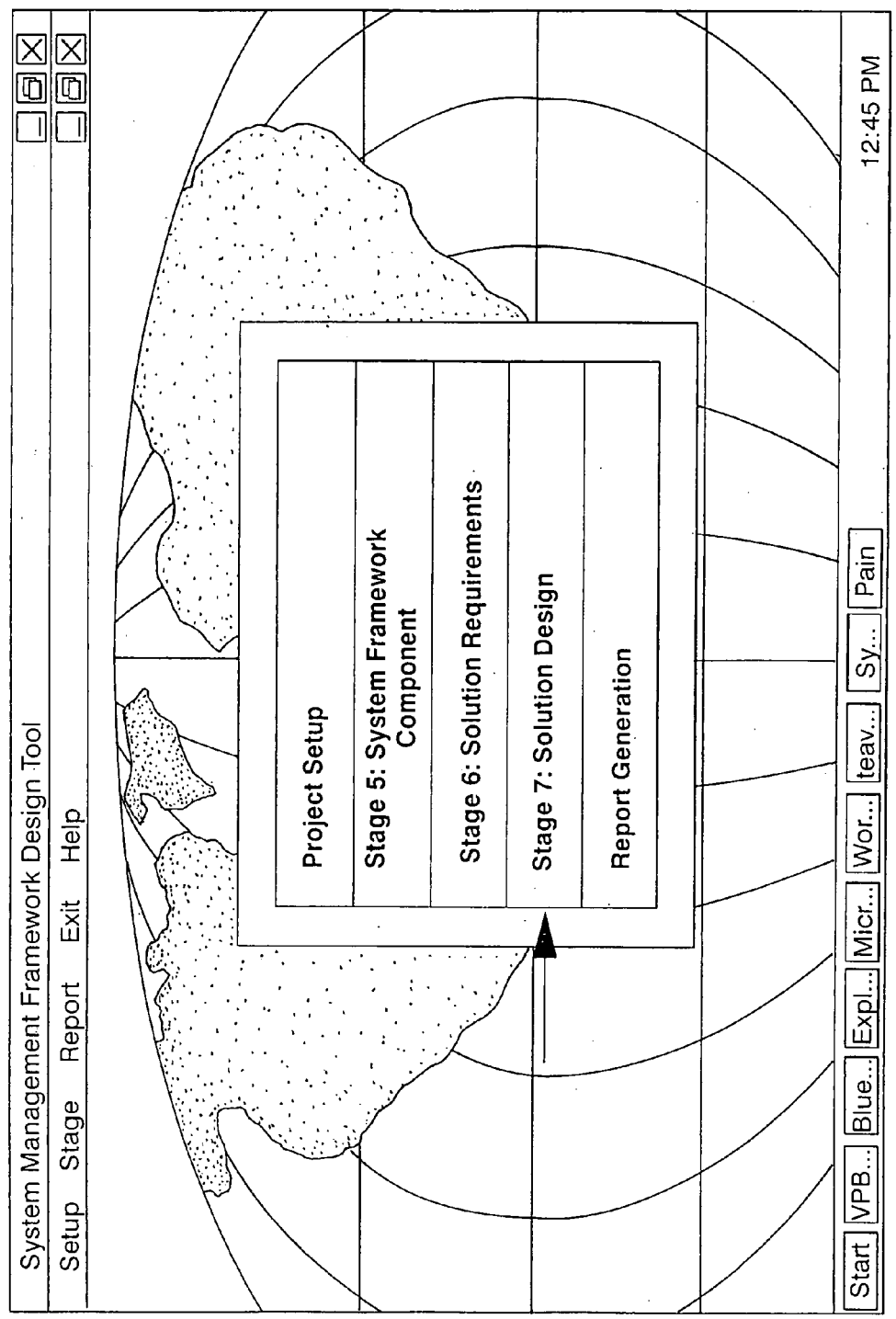
FIG. 25 shows a display screen that may be used to start a further stage of the implementation of this invention.

Next, Stage 7 is executed. At this stage, the skill and tool requirements identified for each cell are assigned, respectively, to generic roles and to generic tools. FIG. 25 illustrates a display screen that may be shown to initiate this stage.

Figure 26A:
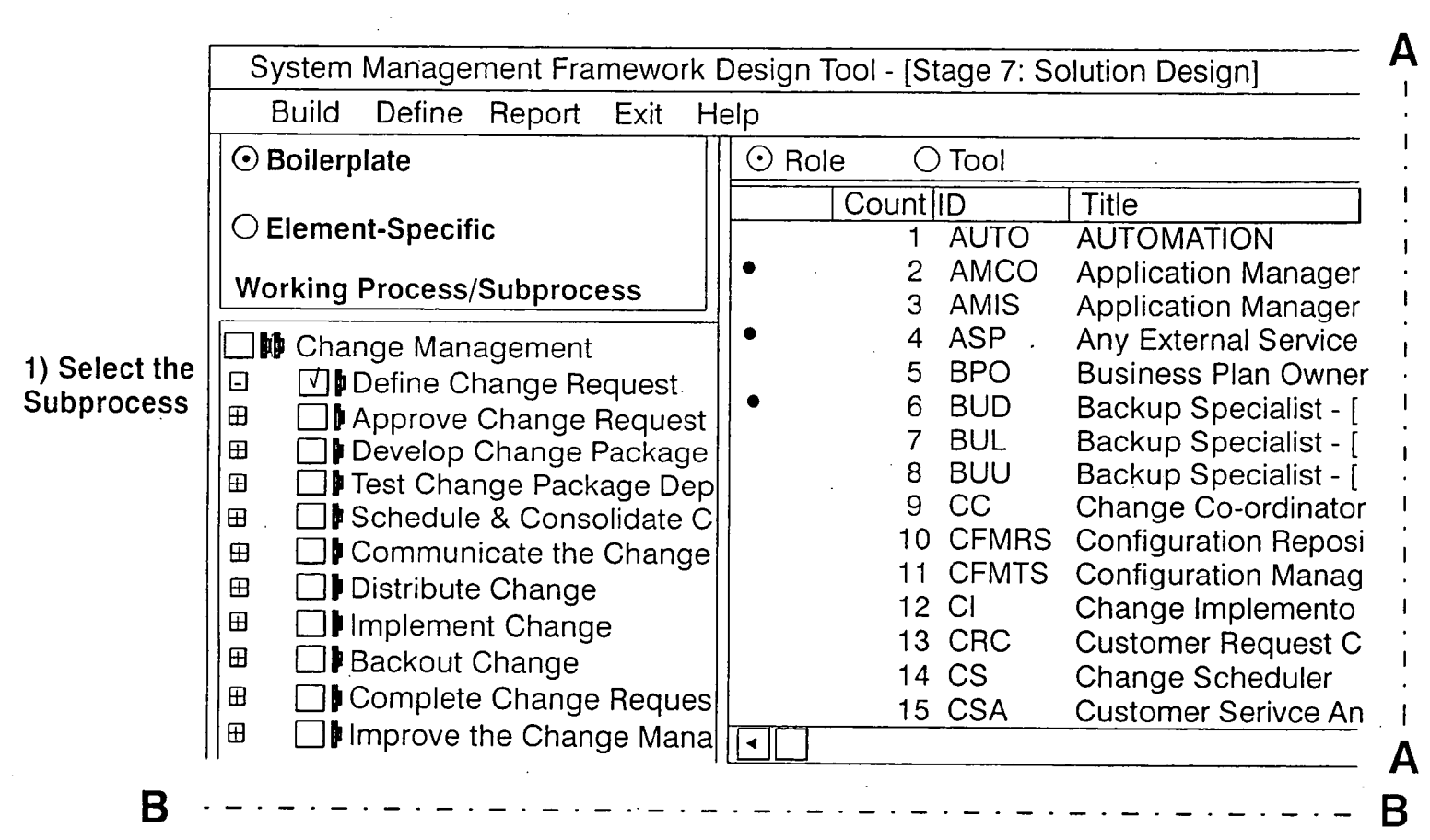
Figure 26B:
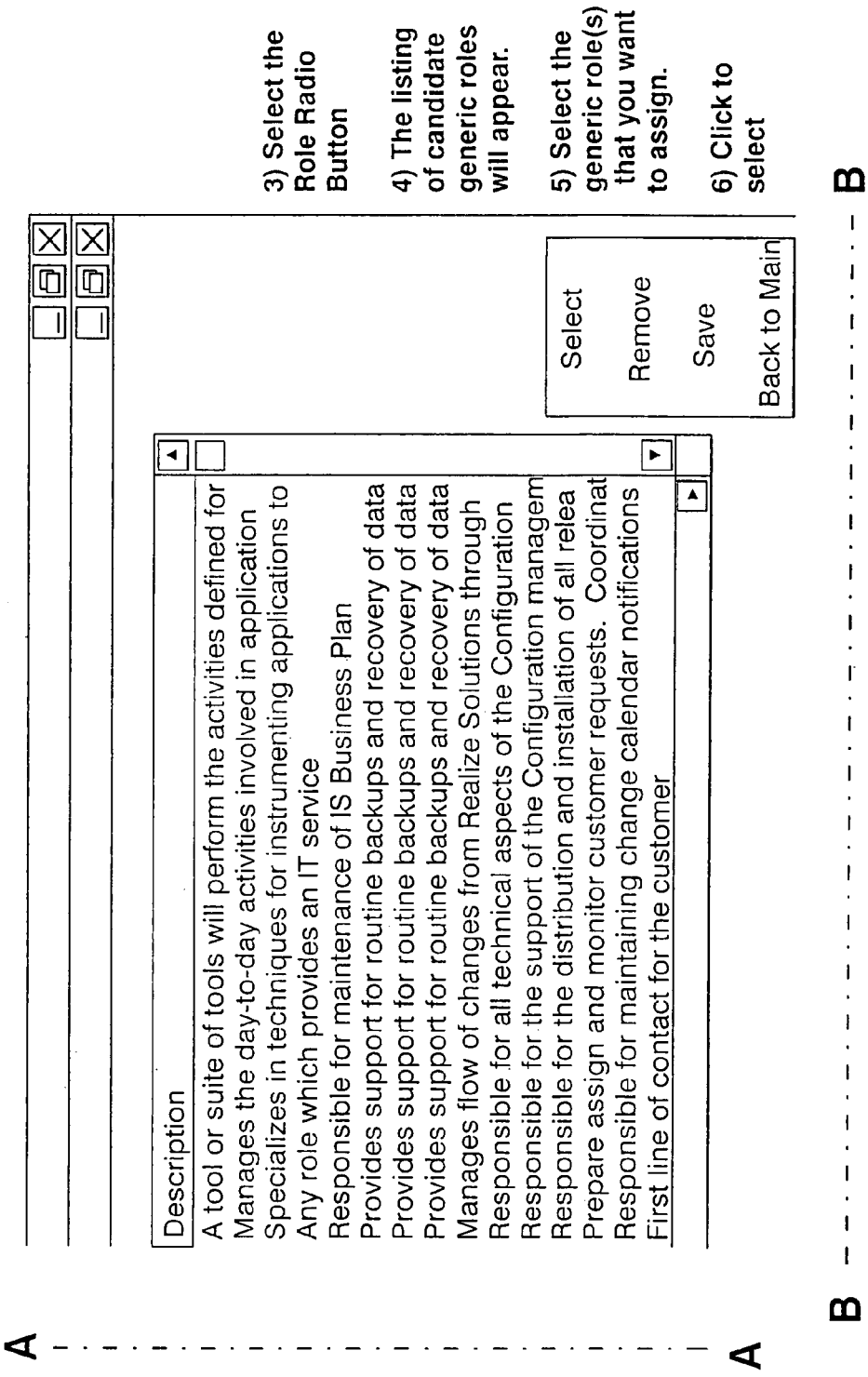
FIGS. 26–28 illustrate display screens that may be shown and used to assign specific-skill requirements to generic roles.
Figure 27A:
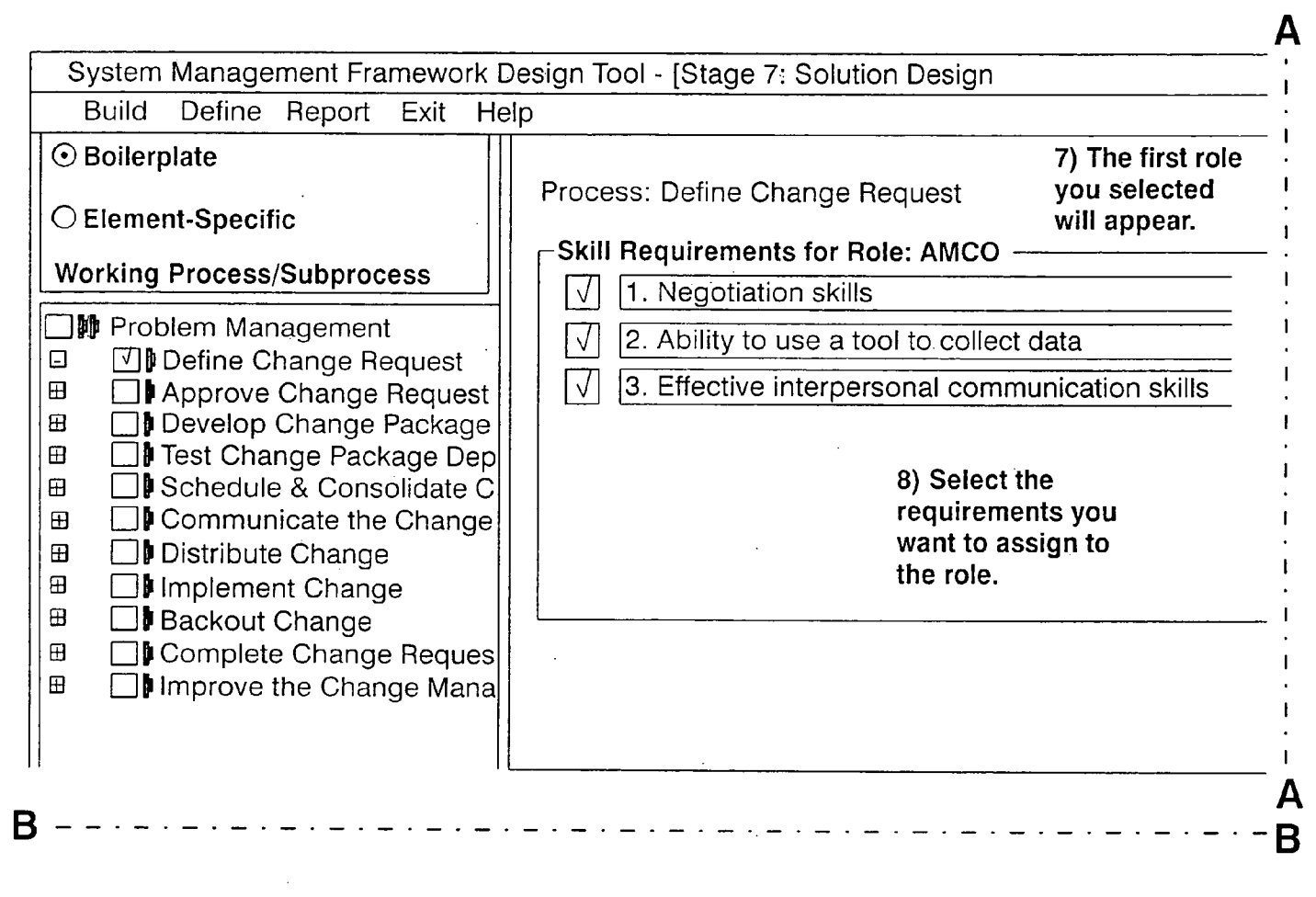
Figure 27B:
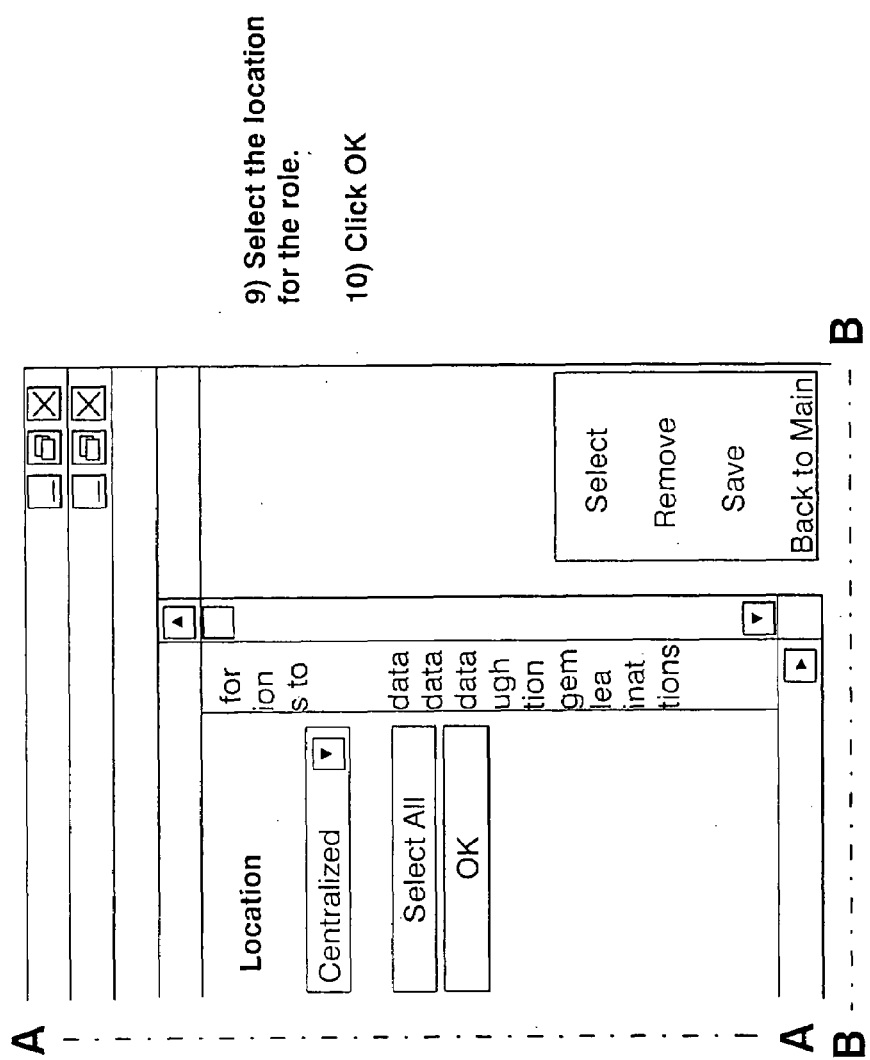
Figure 27C:
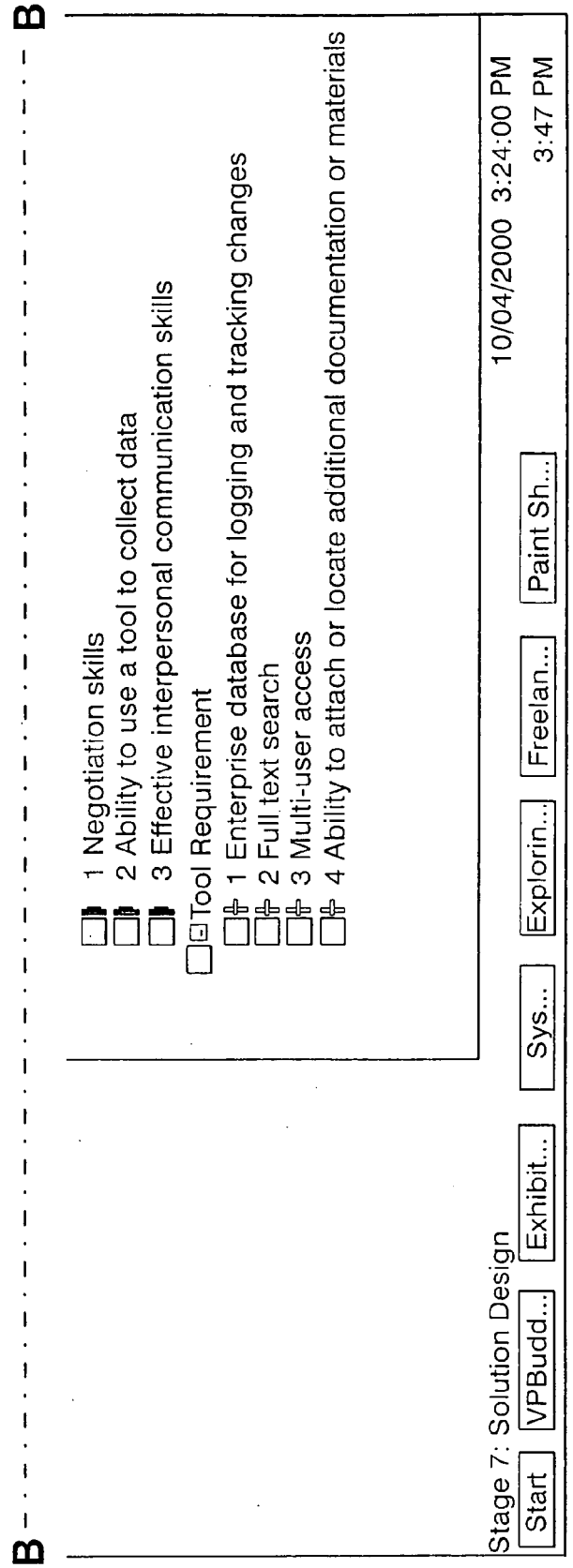
Figure 28B:
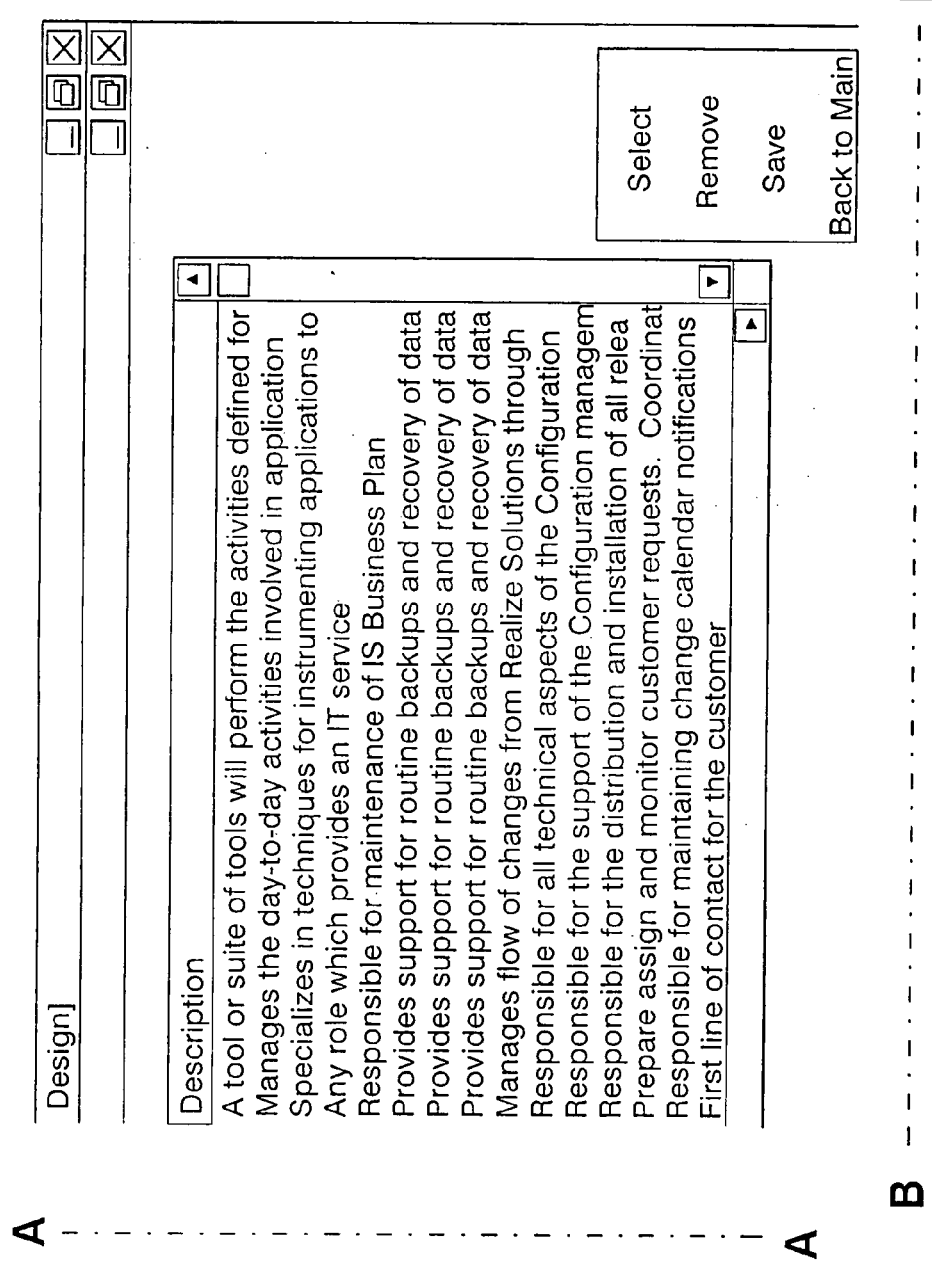

To assign specific skills to generic roles, a sub-process is selected, and a template of pre-given generic roles is displayed, for instance as shown in FIG. 26. From this displayed list, the user identifies a set of generic roles, and a separate list of this selected set is shown. Next, for each skill requirement in the sub-process, the user identifies one, or more, of the selected set of generic roles to which the skill requirement is assigned. This procedure can be repeated for each sub-process column in the matrix. FIGS. 27 and 28 show display screens that may be used in this procedure.

Figure 29B:
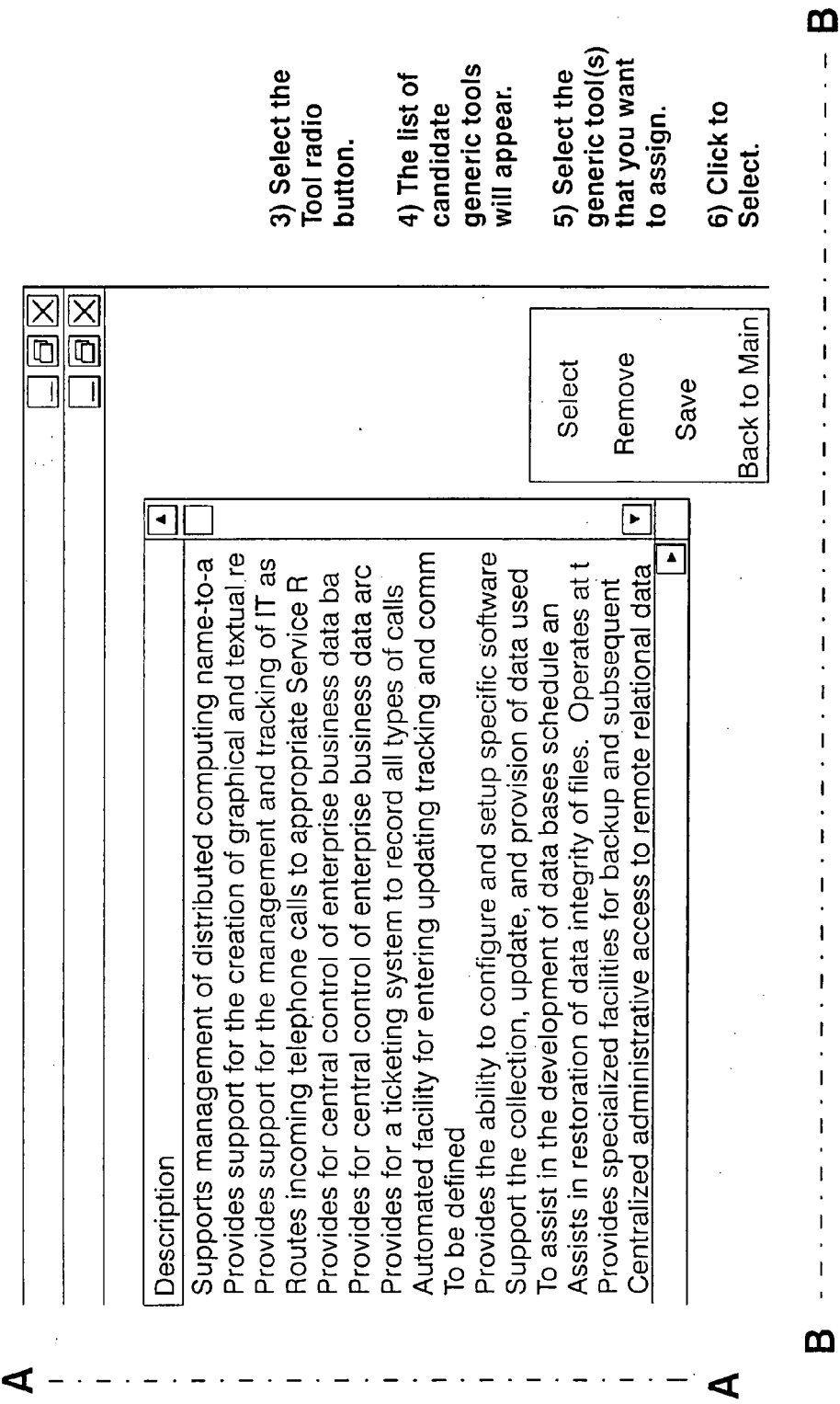
FIGS. 29–31 depict display screens that may be shown and used to assign specific tool requirements to generic tools.
Figure 30B:
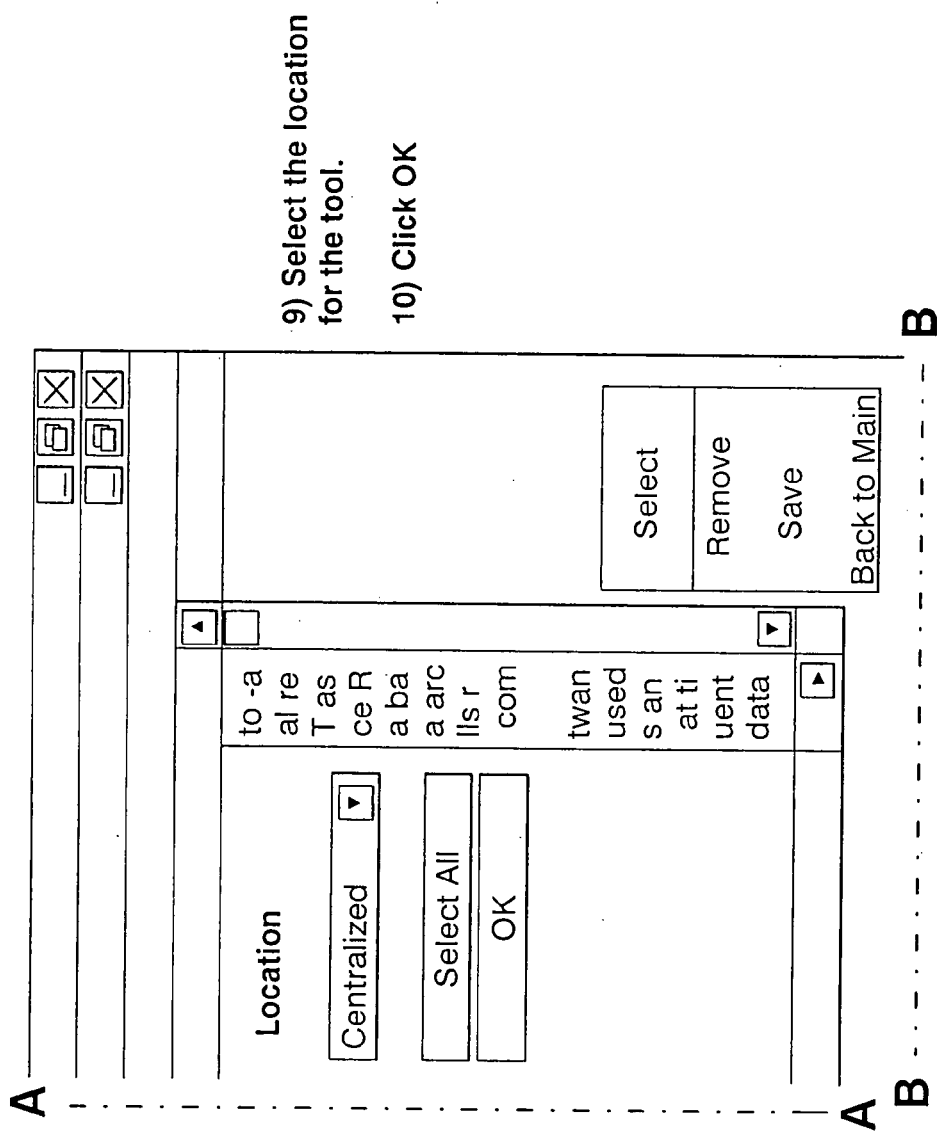
Figure 30C:
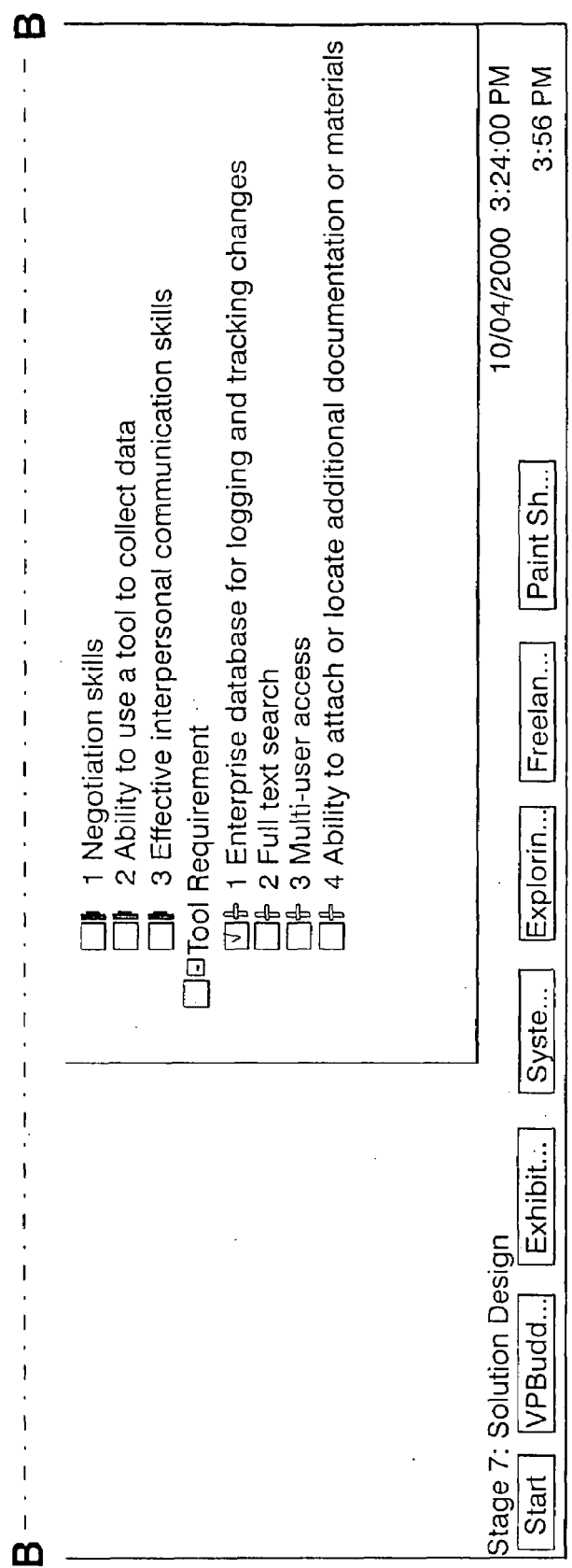
Figure 31B:
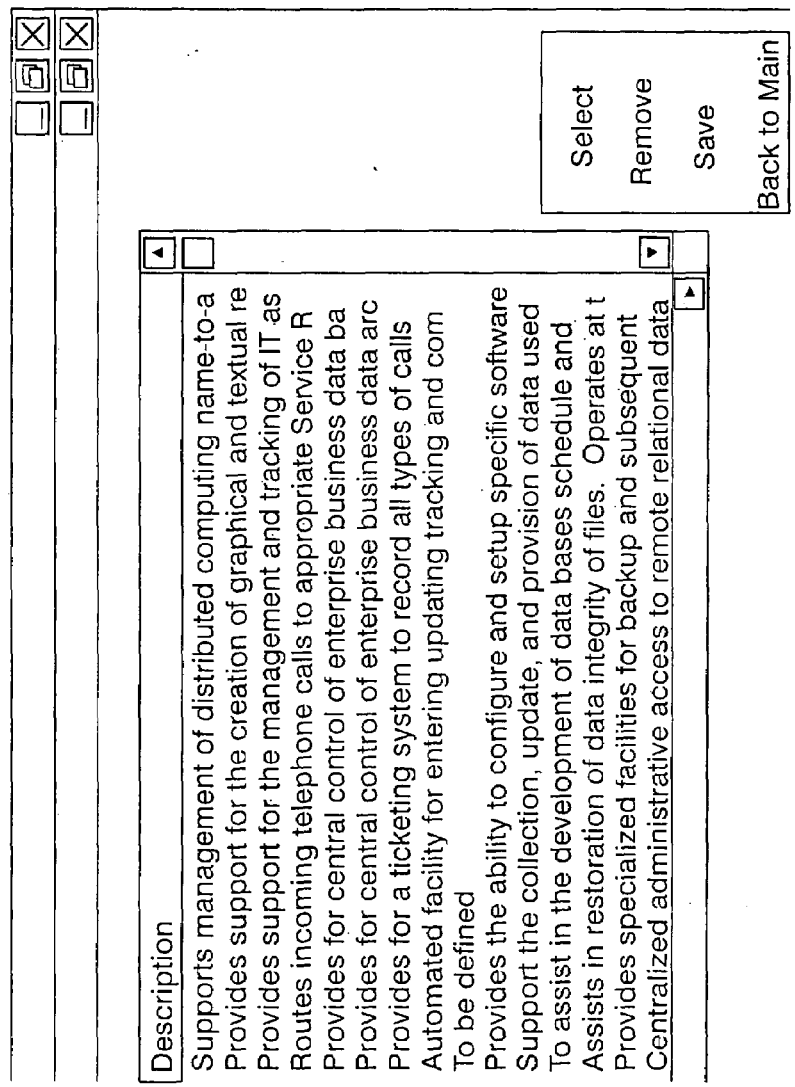

A similar procedure can be used to assign tool requirements to generic tools. A sub-process is selected, and then a template of pre-given generic tools is displayed, for example as shown in FIG. 29. From this display, the user selects a set of generic tools, and a separate list of this set is shown. Then for each tool requirement in the sub-process column, the user identifies one or more of this selected set of generic tools to which the tool requirement is assigned. FIGS. 30 and 31 illustrate display screens that may be shown and used in this procedure.

Figure 32:
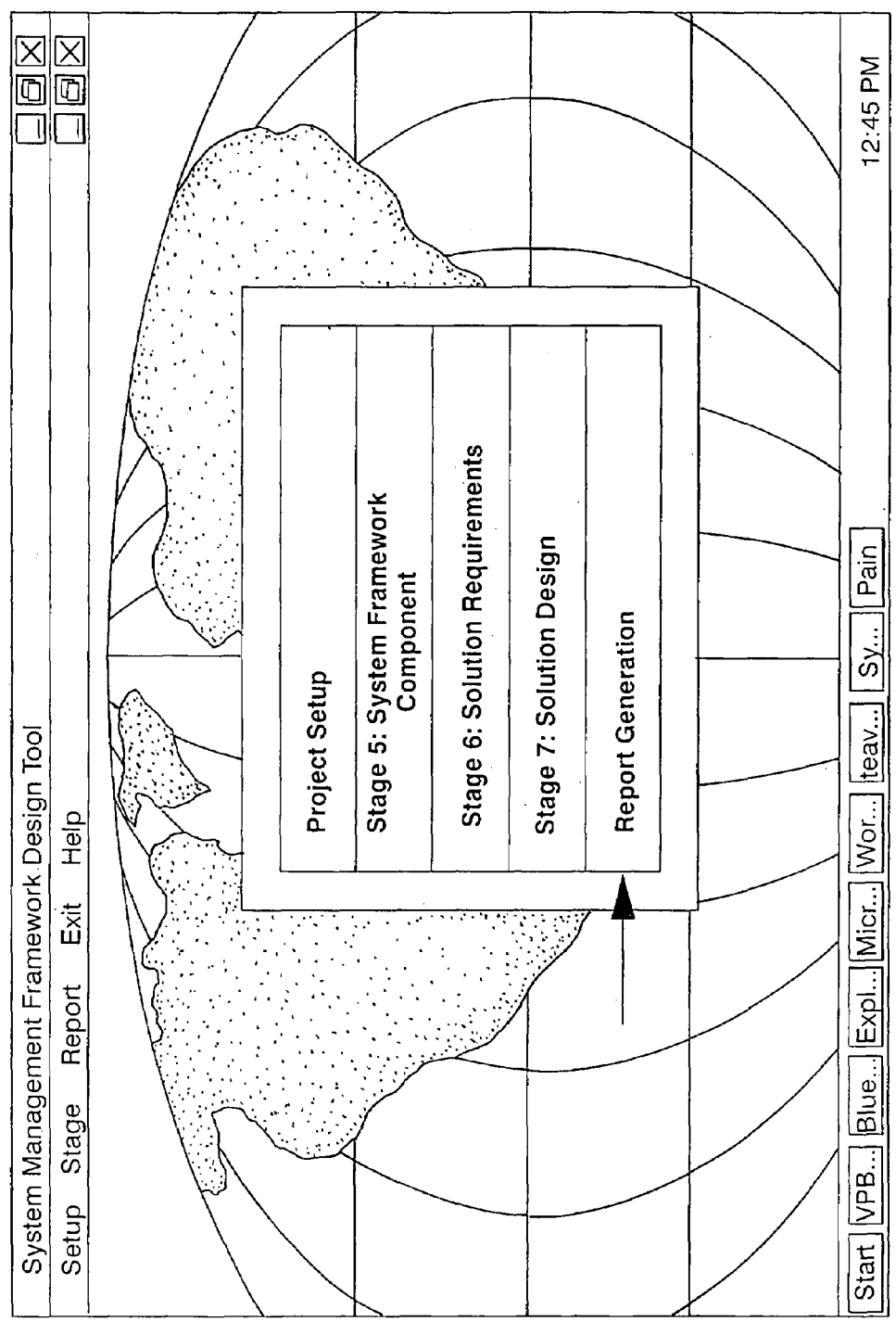
FIG. 32 illustrates a display screen that may be used to generate reports.

Next, as generally represented in FIG. 32, documents or reports may be generated. As will be understood by those of ordinary skill in the art, a wide variety of reports may be generated, both in terms of what information the reports show, and in terms of how that information is shown. FIG. 33 lists examples of reports that may be generated, although this invention may be used to generate many other types of reports as well.

Figure 34A:
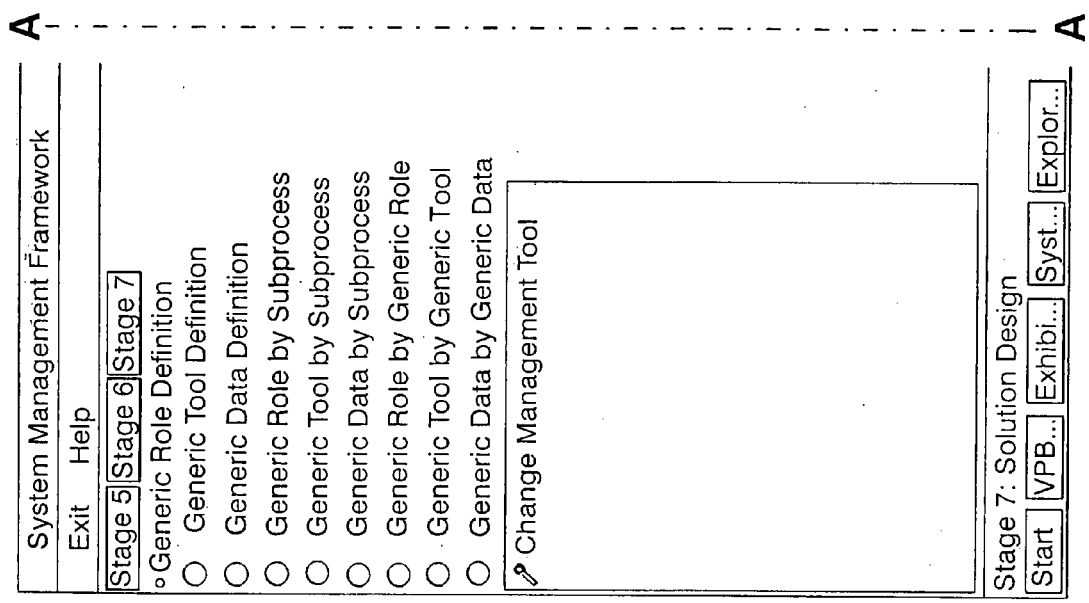
FIG. 34 shows a display screen that may be used to generate reports.
Figure 34B:
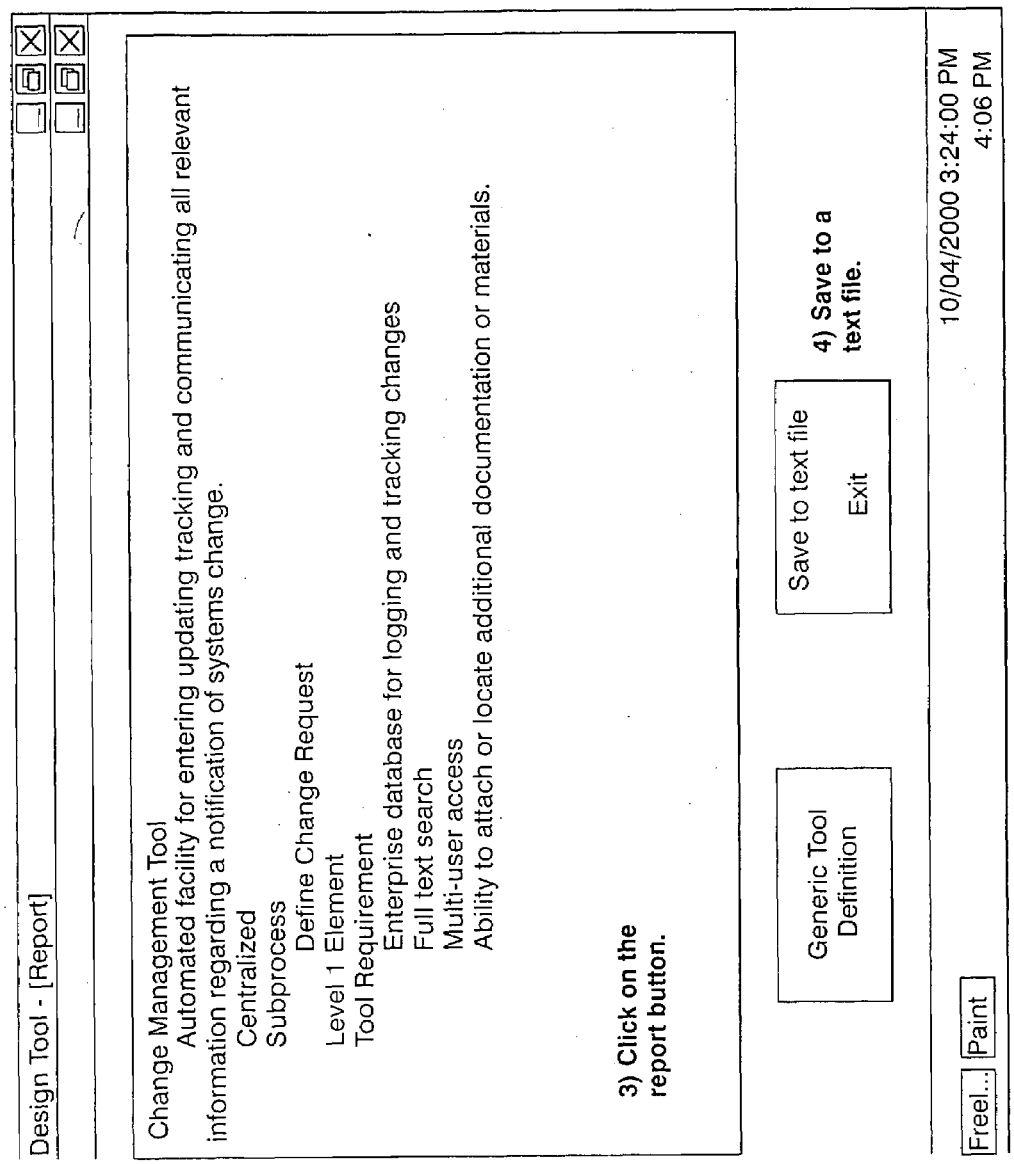

Preferably, the system is provided with a number of pre-defined report types. To generate one of the reports, with reference to FIG. 34, this function, or stage, is selected. As a result of this, a list of the pre-defined report types is displayed, and the user simply selects one of these reports from the list.

The preferred embodiment of this invention provides a number of important advantages. For example, this embodiment provides direct mapping of the tool to the method, so practitioners know which tool functions should be used at what time. Also, the invention provides support for multiple sets of process definitions. Practitioners are able to use the tool interactively with the client project team, and the tool may be used concurrently by multiple design teams. The invention may be used to provide a project specific database, separate from the templates, and may be used to generate a variety of reports in a variety of formats that can be cut and pasted into final documents deliverable to clients. In addition, the use of the invention does not require any special database expertise or any special database software licenses.

As will be appreciated by those skilled in the art, the preferred embodiment of the invention is implemented by using a suitable computer or computer system. In addition, preferably various steps are initiated or performed via graphical user interfaces shown on the display screens. Included herewith as Appendices A, B and C is software code for implementing this invention. In particular, Appendix A contains the visual basic program control files, Appendix B contains the visual basic screen designs, and Appendix C contains the visual basic program logic.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of identifying skills and tools needed to support a process utilizing pre-defined templates, the method comprising:

storing in a computer database a series of pre-defined templates identifying pre-given sub-processes, managed elements, skills and tools;

grouping said series of pre-defined templates into a first set of templates identifying pre-defined sub-processes, a second set of templates identifying pre-defined managed elements, and a third set of templates identifying pre-defined skills and tools, and a fourth set of templates identifying common skills and tools;

accessing the computer database to use one of the first set of pre-defined templates to identify a given set of sub-processes for a process, and to use one of the second set of pre-defined templates to identify a given set of managed elements for said process;

a user manually selecting and de-selecting specific sub-processes from the given set of sub-processes to form a working set of sub-processes for said process, and manually selecting and de-selecting specific managed elements from the given set of managed elements to form a working set of managed elements for said process;

using the working set of sub-processes and the working set of managed elements to form a matrix having a multitude of cells, said matrix having two axes, said working set of sub-processes being listed on one of said axes, and said working set of managed elements being listed on a second of said axes, and wherein each of said working set of sub-processes identify a respective one line of cells of the matrix, and each of said working set of managed elements also identifying a respective one line of cells of the matrix;

accessing the computer database to obtain, for each of the sub-processes in the working set of sub-processes, one of the third set of pre-defined templates to identify a set of skills and tools for the cells in the line of cells identified by said each sub-process, and for each cell in the line of cells identified by said each sub-process, selecting for said each cell at least one specific skill and at least one specific tool from the identified set of skills and tools, wherein in each line of cells, all of the cells of said each line have in common at least some selected skills and tools;

for each of the sub-processes, displaying one of the fourth set of templates, and identifying on the displayed one of the fourth set of templates, all of the skills and tools that all of the cells, in the line of cells identified by said each sub-process, have in common; and for each of at least some of the cells of the matrix, identifying from the database (i) a generic role to perform the selected skill for the cell, and (ii) a generic tool to perform as the selected tool for the cell.

2. A method according to claim 1, further comprising the step of using the templates to identify, for each sub-process, a boilerplate set of skills and tools common to each of the managed elements.

3. A method according to claim 1, further comprising the step of using the templates to assign the skills and tools identified for each of the cells of the matrix to generic roles and tools.

4. A method according to claim 1, wherein said database is accessible by a multitude of users, and said series of templates includes:

master templates accessible by all of said users; and
user specific templates accessible by only selected users.

5. A method according to claim 1, wherein the enabling step includes the step of renaming some of the sub-processes and adding sub-processes to the given set of sub-processes.

6. A method according to claim 1, wherein said process is the design and management of business information technology infrastructures.

7. A method according to claim 1, comprising the further step of, for each line of cells identified by one of the sub-processes, listing as a separate set all of skills and tools that the cells, in said each line of cells, have in common.

8. A system for identifying skills and tools needed to support a process utilizing pre-defined templates, the system comprising:

a computer database storing a series of pre-defined templates identifying pre-given sub-processes, managed elements, skills and tools, said series of pre-defined templates being grouped into a first set of templates identifying pre-defined sub-processes, a second set of templates identifying pre-defined managed elements, and a third set of templates identifying pre-defined skills, and tools, and a fourth set of templates identifying common skills and tools;

means to access the computer database to use one of the first set of pre-defined templates to identify a given set of sub-processes for a process, and to use one of the second set of pre-defined templates to identify a given set of managed elements for said process;

means for enabling a user manually to select and to de-select specific sub-processes from the given set of sub-processes to form a working set of sub-processes for said process, and to select and de-select specific managed elements from the given set of managed elements to form a working set of managed elements for said process;

means to use the working set of sub-processes and the working set of managed elements to form a matrix having a multitude of cells, said matrix having two axes, said working set of sub-processes being listed on one of said axes, and said set working of managed elements being listed on a second of said axes, and wherein each of said working set of sub-processes identify a respective one line of cells of the matrix, and each of said working set of managed elements also identifying a respective one line of cells of the matrix;

means to access the computer database to obtain, for each of the sub-processes in the working set of sub-processes, one of the third set of pre-defined templates to identify a set of skills and tools the cells in the line of cells identified by said each sub-process, and for each cell in the line of cells identified by said each sub-process, selecting for said each cell at least one specific skill and at least one specific tool from the identified set of skills and tools, wherein in each line of cells, all of the cells of said each line have in common at least some selected skills and tools;

for each of the sub-processes, displaying one of the fourth set of templates, and identifying on the displayed one of the fourth set of templates, all of the skills and tools that all of the cells, in the line of cells identified by said each sub-process, have in common; and means for identifying from the database, for each of at least some of the cells of the matrix, (i) a generic role to perform the selected skill for the cell, and (ii) a generic tool to perform as the selected tool for the cell.

9. A system according to claim 8, further comprising means to use the templates to identify, for each sub-process, a boilerplate set of skills and tools common to each of the managed elements.

10. A system according to claim 8, further comprising means to use the templates to assign the skills and tools, identified for each of the cells of the matrix, to generic roles and tools.

11. A program storage device readable by machine, tangibly embodying a program of instructions executable by the machine to perform method steps to identify skills and tools needed to support a process utilizing pre-defined templates, the method steps comprising:

accessing a computer database to access a series of pre-defined templates stored in the database and identifying pre-given sub-processes, managed elements, skills and tools;

grouping said series of pre-defined templates into a first set of templates identifying pre-defined sub-processes, a second set of templates identifying pre-defined managed elements, a third set of templates identifying pre-defined skills and tools, and a fourth set of templates identifying common skills and tools;

using one of the first set of pre-defined templates to identify a given set of sub-processes for a process, and using one of the second set of pre-defined templates to identify a given set of managed elements for said process;

enabling a user to select and to de-select manually specific sub-processes from the given set of sub-processes to form a working set of sub-processes for said process, and to select and to de-select manually specific managed elements from the given set of managed elements to form a working set of managed elements for said process;

using the working set of sub-processes and the working set of managed elements to form a matrix having a multitude of cells, said matrix having two axes, said working set of sub-processes being listed on one of said axes, and said working set of managed elements being listed on a second of said axes, and wherein each of said working set of sub-processes identify a respective one line of cells of the matrix, and each of said working set of managed elements also identifying a respective one line of cells of the matrix;

accessing the computer database to obtain, for each of the sub-processes in the working set of sub-processes, one of the third set of pre-defined templates to identify a set of skills and tools for the cells in the line of cells identified by said each sub-process, and for each cell in the line of cells identified by said each sub-process, selecting for said each cell at least one specific skill and at least one specific tool from the identified set of skills and tools, wherein in each line of cells, all of the cells of said each line have in common at least some selected skills and tools;

for each of the sub-processes, displaying one of the fourth set of templates, and identifying on the displayed one of the fourth set of templates, all of the skills and tools that all of the cells, in the line of cells identified by said each sub-process, have in common; and for each of at least some of the cells of the matrix, identifying from the database (i) a generic role to perform the selected skill for the cell, and (ii) a generic tool to perform as the selected tool for the cell.

12. A program storage device according to claim 11, wherein said method steps further comprise the step of using the templates to identify, for each sub-process, a boilerplate set of skills and tools common to each of the managed elements.

13. A program storage device according to claim 11, wherein said method steps further comprise the step of using the templates to assign the skills and tools identified for each of the cells of the matrix to generic roles and tools.

* * * * *